US008455637B2

(12) United States Patent
Shibata et al.

(10) Patent No.: US 8,455,637 B2

(45) Date of Patent: Jun. 4, 2013

(54) PROCESS FOR ADJUSTING DEGREE OF ACETYL SUBSTITUTION OF CELLULOSE ACETATE

(75) Inventors: Tohru Shibata, Himeji (JP); Yuichiro Shuto, Himeji (JP); Masaaki Ito, Otake (JP); Tanemi Asai, Kakogawa (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 13/049,409

(22) Filed: Mar. 16, 2011

(65) Prior Publication Data

US 2011/0166340 A1 Jul. 7, 2011

Related U.S. Application Data

(60) Continuation of application No. 12/259,286, filed on Oct. 27, 2008, now abandoned, which is a division of application No. 10/257,645, filed as application No. PCT/JP02/02410 on Mar. 14, 2002.

(30) Foreign Application Priority Data

Mar. 14, 2001 (JP) .................................. 2001-73076
Jun. 28, 2001 (JP) ................................ 2001-195843
Nov. 5, 2001 (JP) ................................ 2001-339692

(51) Int. Cl.
*C08B 3/06* (2006.01)
*C08B 1/00* (2006.01)
*C08B 3/00* (2006.01)

(52) U.S. Cl.
USPC .................... 536/69; 536/56; 536/58; 536/63

(58) Field of Classification Search
USPC ......................................... 536/69, 56, 58, 63
See application file for complete search history.

(56) References Cited

U.S. PATENT DOCUMENTS

| | | | | |
|---|---|---|---|---|
| 4,306,060 A | | 12/1981 | Ikemoto | |
| 5,608,050 A | * | 3/1997 | Kuo et al. | 536/69 |
| 5,663,310 A | | 9/1997 | Shimoda et al. | |
| 5,705,632 A | | 1/1998 | Shimoda et al. | |
| 5,783,121 A | | 7/1998 | Yamazaki et al. | |
| 5,962,677 A | | 10/1999 | Murakami et al. | |
| 5,990,304 A | | 11/1999 | Kiyose et al. | |
| 6,984,730 B2 | | 1/2006 | Yamada et al. | |
| 2004/0024198 A1 | | 2/2004 | Shibata et al. | |

FOREIGN PATENT DOCUMENTS

| | | | |
|---|---|---|---|
| JP | 08-098497 | | 11/1997 |
| JP | 9-286801 A | | 11/1997 |
| JP | 11-005851 A | | 1/1999 |
| JP | 11005851 A | * | 1/1999 |

OTHER PUBLICATIONS

Niculae Olaru et al.; Die Angewandte Makromolekulare Chemie, 241, pp. 67-76 (Nr. 4211), 1996.

* cited by examiner

*Primary Examiner* — Wu-Cheng Winston Shen
*Assistant Examiner* — Everett White
(74) *Attorney, Agent, or Firm* — Birch, Stewart, Kolasch & Birch, LLP

(57) ABSTRACT

A process for adjusting an intermolecular or intramolecular degree of acetyl substitution of cellulose acetate is disclosed. The process comprises ripening cellulose acetate in the presence of a catalyst, an acetyl donor, and water or an alcohol. The amount of water and the alcohol is in the range of 0.1 to 10 mol % based on the amount of the acetyl donor.

7 Claims, 6 Drawing Sheets

PROCESS FOR ADJUSTING DEGREE OF ACETYL SUBSTITUTION OF CELLULOSE ACETATE

CROSS-REFERENCE TO RELATED APPLICATIONS

This application is a continuation of U.S. application Ser. No. 12/259,286, filed Oct. 27, 2008. Application Ser. No. 12/259,286 is a divisional of U.S. application Ser. No. 10/257,645, filed Oct. 15, 2002, which the national phase under 35 U.S.C. §371 of PCT International Application No. PCT/JP02/02410 filed Mar. 14, 2002 which claims priority of Japanese Patent Application No. 2001-73076 filed Mar. 14, 2001; 2001-195843 filed Jun. 28, 2001; and 2001-339692 filed Nov. 5, 2001, the complete disclosures of which are hereby incorporated by reference.

FIELD OF THE INVENTION

The present invention relates to a process for adjusting intermolecular or intramolecular degree of acetyl substitution by ripening cellulose acetate.

BACKGROUND OF THE INVENTION

Cellulose acetate, particularly cellulose acetate having a degree of acetyl substitution of 2.6 or more (generally classified into cellulose triacetate), is tough and excellent in heat-resistance. Therefore, cellulose acetate has been used in various technical fields. For example, a cellulose acetate film is a representative photographic support. Further, a cellulose acetate film shows an excellent optical isotropy. Accordingly, a cellulose acetate film is used in a liquid crystal display, which has recently extended its market. In the liquid crystal display, the cellulose acetate film is used as a protective film of a polarizing plate, a phase retardation film or a color filter.

A cellulose acetate film is generally formed according to a solvent cast method, in which a cellulose acetate solution (dope) is cast onto a support, and dried to evaporate the solvent to form a film.

In preparation of a cellulose acetate product such as the film according to the solvent cast method, a degree of acetyl substitution of the cellulose acetate is closely related to a solubility of the cellulose acetate in a solvent and physical characteristics (including optical characteristics) of the products. It has been well known that cellulose acetate having a high degree of acetyl substitution shows a low solubility in a solvent, but forms a product of excellent physical characteristics. On the other hand, cellulose acetate having a low degree of acetyl substitution shows a high solubility in a solvent, but forms a product having problems in physical characteristics.

Dichloromethene is the most conventional solvent of cellulose acetate. Cellulose acetate is well dissolved in dichloromethane. Therefore, cellulose acetate having a high degree of acetyl substitution has been dissolved in dichloromethane to prepare a cellulose acetate product having excellent physical characteristics according to a conventional solvent cast method. The low solubility of the cellulose acetate having a high degree of acetyl substitution cannot be a problem where dichloromethane is used as the solvent.

However, use of hydrocarbon halides such as dichloromethane has recently been restricted severely to protect the global environment. Further, dichloromethane is apt to vaporize in the process for the preparation of a product, because it has a low boiling point (41° C.). Accordingly, dichloromethane may cause problems in the working environment. Therefore, the process is conducted under closed conditions.

Japanese Patent Provisional Publication Nos. 9 (1997)-95544, 9 (1997)-95557, 9 (1997)-95538 propose a process for preparing the cellulose acetate solution, which comprises the steps of cooling a mixture of cellulose acetate and an organic solvent, and then heating the mixture to prepare the solution. The process comprising the cooling and heating steps (which is sometimes referred to as a cooling dissolution method) makes it possible to prepare a solution from cellulose acetate and an organic solvent in which cellulose acetate cannot be dissolved according to a conventional process. Therefore, the cooling dissolution method is very advantageous particularly where a film is prepared from cellulose triacetate (having a degree of acetyl substitution of 2.6 or more), which has poor solubility.

SUMMARY OF THE INVENTION

The cooling dissolution method now makes it possible to prepare a cellulose acetate product from poorly soluble cellulose triacetate (having a degree of acetyl substitution of 2.6 or more) according to a solvent cast method without use of hydrocarbon halides such as dichloromethane.

However, cellulose acetate having a high degree of acetyl substitution still shows a low solubility in an organic solvent even if a cooling dissolution method is used. Further, a solution of cellulose acetate having a high degree of acetyl substitution in an organic solvent has a problem in stability.

An object of the present invention is to improve solubility of cellulose acetate having a relatively high degree of acetyl substitution.

Another object of the invention is to provide a cellulose acetate in which the relation among the degrees of acetyl substitution at 2-, 3- and 6-positions is properly controlled.

A further object of the invention is to prepare a cellulose acetate solution whose solubility and viscosity are easily controlled.

A furthermore object of the invention is to prepare a cellulose acetate film having preferable properties and optical characters.

A still further object of the invention is to prepare a cellulose acetate film having excellent physical characteristics by using a solution of cellulose acetate having a relatively high degree of acetyl substitution.

The present invention provides a process for adjusting an intermolecular or intramolecular degree of acetyl substitution of cellulose acetate, which comprises ripening cellulose acetate in the presence of a catalyst, an acetyl donor, and water or an alcohol, and under a condition that the amount of water and the alcohol is in the range of 0.1 to 10 mol % based on the amount of the acetyl donor.

The invention also provides a process for preparation of cellulose acetate which comprises the steps of: reacting cellulose in a solvent with acetic acid or acetic anhydride in the presence of an acid catalyst to synthesize cellulose acetate; and ripening the synthesized cellulose acetate in the presence of the remaining acid catalyst, an acetyl donor, and water or an alcohol, and under a condition that the amount of water and the alcohol is in the range of 0.1 to 10 mol % based on the amount of the acetyl donor.

The invention further provides a process for preparation of cellulose acetate which comprises the steps of: reacting cellulose in a solvent with acetic acid or acetic anhydride in the presence of an acid catalyst to synthesize cellulose acetate; neutralizing the acid catalyst to stop the synthesizing reaction; and ripening the synthesized cellulose acetate in the presence of a catalyst, and under a condition that the amount of water and an alcohol is less than 10 mol % based on the amount of the acetyl donor.

The above-mentioned processes can form cellulose acetate having new characteristics.

The invention provides cellulose acetate having a degree of acetyl substitution in the range of 2.636 to 2.958, wherein the cellulose acetate shows a distribution curve of an intermolecular substitution degree in which the maximum peak has a half width (unit: difference of intermolecular substitution degrees) of less than 0.080.

The invention also provides cellulose acetate having a degree of acetyl substitution in the range of 2.636 to 2.958, wherein the cellulose acetate shows a distribution curve of an intermolecular substitution degree in which the maximum peak has a half width of less than Y defined in the following formula:

$$Y=-0.17788X+0.5788$$

in which X is the degree of acetyl substitution.

The invention further provides cellulose acetate showing an infrared absorption spectrum, wherein the absorption spectrum has the absorption maximum in the wave number range of 3450 to 3550 $cm^{-1}$ in which the absorption maximum has a half width of 135 $cm^{-1}$ or less.

The invention furthermore provides cellulose acetate in which the degrees of acetyl substitution at 2-, 3- and 6-positions satisfy the following formulas (I) to (III):

$$2DS+3DS<6DS\times4-1.70 \quad (I)$$

$$2DS+3DS<-6DS\times4+5.70 \quad (II)$$

$$2DS+3DS>1.80 \quad (III)$$

in which 2DS is the degree of acetyl substitution at 2-position; 3DS is the degree of acetyl substitution at 3-position; and 6DS is the degree of acetyl substitution at 6-position.

The invention still furthermore provides a cellulose acetate in which the degrees of acetyl substitution at 2-, 3- and 6-positions satisfy the following formulas (III) to (V):

$$2DS+3DS>1.80 \quad (III)$$

$$3DS<2DS \quad (IV)$$

$$6DS>0.80 \quad (V)$$

in which 2DS is the degree of acetyl substitution at 2-position, 3DS is the degree of acetyl substitution at 3-position, and 6DS is the degree of acetyl substitution at 6-position.

According to study of the present inventors, the intermolecular degree of acetyl substitution can be adjusted to be uniform by ripening cellulose acetate in the presence of a catalyst, an acetyl donor, and water or an alcohol, and under a condition that the amount of water and the alcohol is in the range of 0.1 to 10 mol % based on the amount of the acetyl donor.

Each of T. R. Floyd (J. Chromatogr., 629, 243 (1993) and Kawai (Articles of polymer (written in Japanese), Vol. 54, No. 9, 526 (1997) reports an intermolecular degree of acetyl substitution about cellulose diacetate having a low degree of acetyl substitution, which was evaluated by using a reverse phase HPLC. However, there is no report about cellulose triacetate having a high degree of acetyl substitution.

The inventors have further studied cellulose acetate having a uniform intermolecular degree of acetyl substitution, and found that cellulose acetate having the uniform degree shows an excellent solubility even though the substitution degree is relatively high (2.636 to 2.958). Now, a cellulose acetate product having excellent physical characteristics can be prepared by using a solution of cellulose acetate having excellent solubility according to the present invention.

According to further study of the inventors, the degrees of acetyl substitution at 2-, 3- and 6-positions can be easily and properly controlled by ripening cellulose acetate under a condition that the amount of water and an alcohol is in the range of 0.1 to 10 mol % based on the amount of the acetyl donor.

The degrees of acetyl substitution at 2-, 3- and 6-positions can be effectively controlled as is mentioned above to prepare cellulose acetate satisfying the formulas (I) to (III) or (III) to (V).

The cellulose acetate having the properly controlled degrees of acetyl substitution makes it possible to prepare easily a cellulose acetate solution whose solubility and viscosity can be easily controlled. Further, the invention also makes it possible to prepare easily a cellulose acetate film having excellent physical and optical characteristics.

The study of the inventors furthermore revealed that cellulose acetate having good solubility shows a specific infrared absorption spectrum in which an absorption maximum having a half width of 135 $cm^{-1}$ or less is in the range of 3450 to 3550 $cm^{-1}$. The absorption maximum is attributed to cellulose acetate from which a cellulose acetate solution dissolving cellulose acetate well can be prepared. Further, from the thus-prepared solution a cellulose acetate film having preferable properties and optical characters can be formed.

Figure 1:
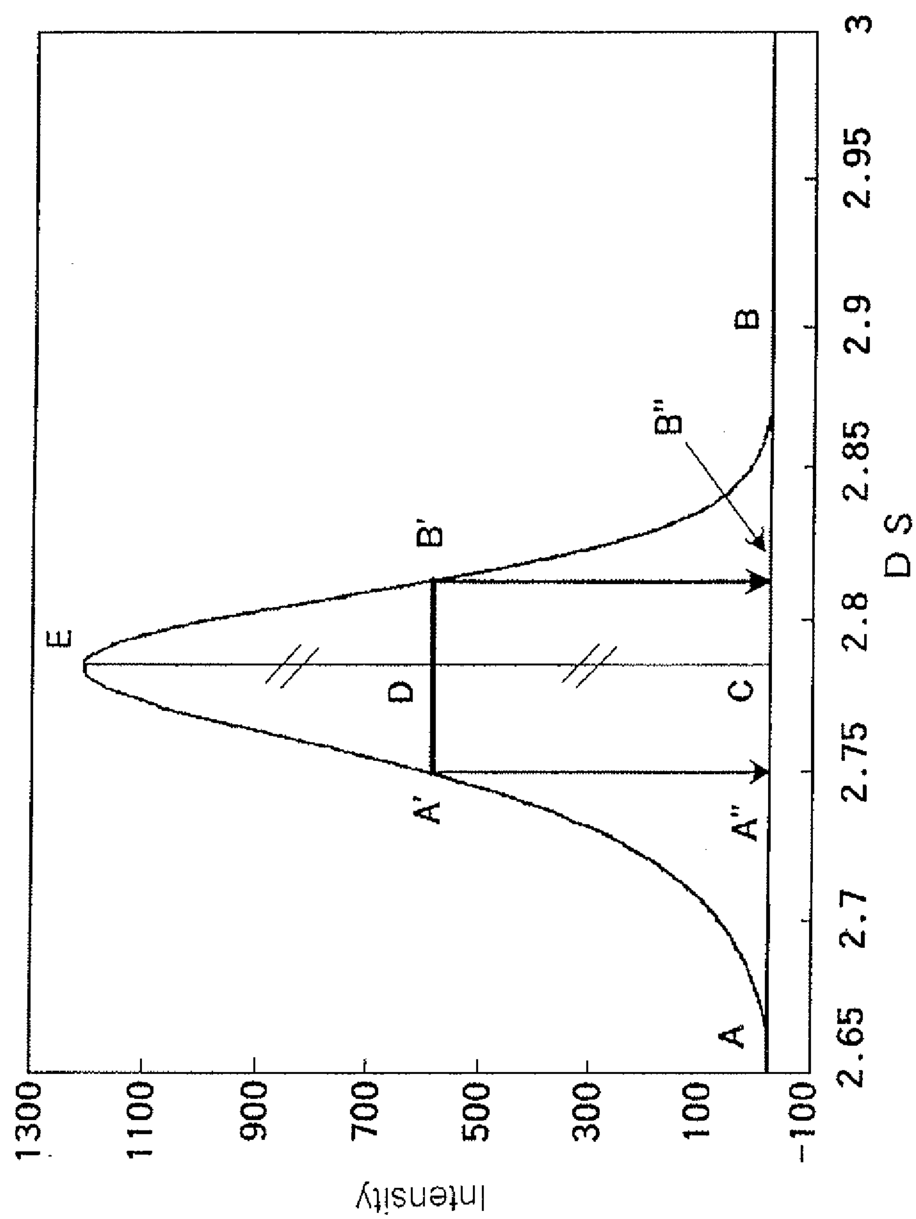
FIG. 1 is a graph showing a distribution curve of an intermolecular substitution degree of cellulose acetate prepared in Example 4.

DETAILED DESCRIPTION OF THE INVENTION (Preparation of Cellulose Acetate)

Cellulose as the starting material for preparation of cellulose acetate can be obtained from cotton linters or wood pulp. A mixture of raw pulp can be also used.

Cellulose (the starting material) is reacted in a solvent with acetic acid or acetic anhydride in the presence of a catalyst to synthesize cellulose acetate. In the synthesis, acetic acid as the solvent, sulfuric acid as the catalyst and acetic anhydride as the acetyl donor are usually used.

Migita et al. (Mokuzai Kagaku (Wood Chemistry, written in Japanese), 1968, Kyoritsu Shuppan, pp. 180 to 190) describe the principle of cellulose acetate synthesis. A typical synthesis method is a homogeneous acetylation process with a system of acetic anhydride (acetyl donor)acetic acid (solvent)-sulfuric acid (catalyst). The process comprises the steps of: pretreating cellulose (starting material) such as wood pulp with an adequate amount of acetic acid, and then pouring the material into a cooled acetylation mixture to prepare cellulose acetate. The acetylation mixture generally comprises acetic acid as the solvent, acetic anhydride as the acetyl donor (esterifying agent) and sulfuric acid as the catalyst. The amount of acetic anhydride is usually in stoichiometrical excess of the total amount of water and cellulose to react in the system. Accordingly, after the acetylation reaction is completed, an aqueous solution of neutralizing agent (e.g., carbonates, acetates and oxides of sodium, potassium, calcium, magnesium, iron, aluminum, zinc and ammonium) is added so as to neutralize the remaining excess acetic anhydride and esterifying catalyst.

In a conventional process, the prepared cellulose acetate is kept at 50 to 90° C. in the presence of a little amount of acetylation catalyst (generally, sulfuric acid) to conduct saponification (ripening). The degrees of acetyl substitution and polymerization of cellulose acetate is appropriately adjusted at the ripening process. After the cellulose acetate is ripened, the above-described neutralizing agent can be added to neutralize completely the remaining catalyst. The cellulose acetate can also be used at the next step without neutralizing process. The obtained cellulose acetate solution is poured into water or diluted acetic acid (or water or diluted acetic acid is poured into the solution) to separate cellulose acetate from the solution. The separated cellulose acetate is then washed, and is subjected to a stabilizing treatment.

In Japanese Patent Provisional Publication No. 11 (1999)-5851, the acetylation reaction is performed with a small amount of sulfuric acid to obtain cellulose acetate whose degree of acetyl substitution at 6-position is relatively high. However, cellulose acetate prepared with such a small amount of sulfuric acid often has poor solubility. Further, white insoluble materials are often formed in a solution of the cellulose acetate. The acetylation reaction slowly proceeds as solid cellulose (starting material) is gradually acetylated and dissolved. Therefore, cellulose dissolved earlier is different in a reaction speed from cellulose dissolved later in the reaction under a condition of a small amount of sulfuric acid. Consequently, the reaction gives cellulose acetate inhomogeneous with respect to the intermolecular degree of acetyl substitution.

The inventors have found that cellulose acetate having a uniform intermolecular degree of acetyl substitution can be prepared by ripening cellulose acetate in the presence of a catalyst, an acetyl donor, and water or an alcohol, and under a condition that the amount of water and an alcohol is in the range of 0.1 to 10 mol % (0.1 mol % or more and less than 10 mol %) based on the amount of the acetyl donor.

The inventors have also found that the degrees of acetyl substitution at 2-, 3- and 6-positions can be easily and properly controlled by ripening cellulose acetate in the presence of a catalyst, an acetyl donor, and water or an alcohol, and under a condition that the amount of water and an alcohol is 0.1 to 10 mol % (0.1 mol % or more and less than 10 mol %) based on the amount of the acetyl donor.

In the case where synthesis and ripening (controlling degree of acetyl substitution) of cellulose acetate are successively conducted, neutralizing treatment (neutralization of an acid catalyst used in the synthesis reaction) need not be conducted, or can partially be conducted to use all or a part of the remaining catalyst in an ripening reaction at the next stage.

The acetyl donor is a compound having acetyl group (—$COCH_3$) that can be given to remaining hydroxyl (—OH) of cellulose acetate through the ester-exchanging reaction or esterifying reaction in the presence of a catalyst. The acetyl donor preferably is acetic acid or an acetic ester, and more preferably is acetic acid or an acetic ester of an alcohol.

According to the study of the inventors, if the amount of water and an alcohol is 10 mol % or more based on the amount of the acetyl donor, the acetyl groups are liable to be eliminated from highly substituted cellulose acetate (degrees of acetyl substitution at 2-, 3- and 6-positions in total is 2.6367 or more, particularly 2.70 or more).

In contrast, when the amount of water and an alcohol is less than 10 mol % (preferably, less than 7 mol %), the acetylation of dissociated hydroxyl proceeds at a speed comparable to the reaction speed of elimination of acetyl groups. As a result, the reactions converge on an equilibrium point. Therefore, the amount of water and an alcohol is set to be less than 10 mol % based on the amount of the acetyl donor, and thereby the reaction between the acetyl donor and cellulose acetate is made to be reversible. An equilibrium between a glucose unit having remaining hydroxyl (at 2-, 3- or 6-position) with an acetyl donor (R—O—$COCH_3$ in which R is hydrogen or an alkyl group) and a glucose unit having no hydroxyl (acetyl groups are combined to 2-, 3- and 6-positions) with water or an alcohol (R—OH, in which R is hydrogen or an alkyl group) is controlled to obtain a uniform intermolecular degree of acetyl substitution.

Water or an alcohol (0.1 mol % or more based on the acetyl donor) is essential for the above-mentioned equilibrium.

Further, the intramolecular degrees of substitution at 2-, 3- or 6-positions can also be easily adjusted where the reaction between the acetyl donor and cellulose acetate is reversible. The equilibrium shown below between the acetyl donor (R—O—$COCH_3$ in which R is hydrogen or an alkyl group) and a glucose unit having hydroxyl at 2-, 3- or 6-position is so controlled that the degrees of acetyl substitution at 2-, 3- and 6-positions can effectively be adjusted.

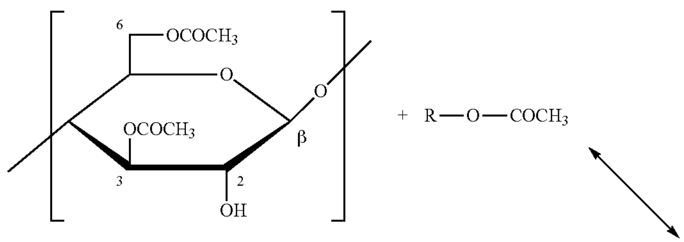

-continued

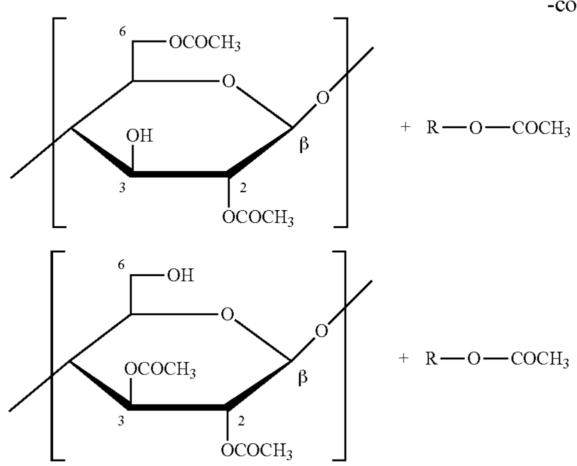

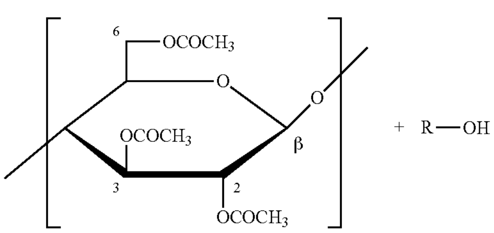

The catalyst used in the ripening step is preferably an acid or a metal (e.g., titanium, tin) ion. The acid may be a Lewis acid as well as a normal proton acid. If the ripening step is carried out in ethyl acetate (acetyl donor)-alcohol (solvent) system, metal alkoxides and or panic bases (e.g., dialkylaminopyridine, N-methylimidazole) may be used as the catalyst. The most preferred catalyst is an acid.

The acid catalyst preferably is a strong acid (e.g., sulfonic acid, perchloric acid, sulfuric acid, boron trifluoride, tetrafluoroboric acid). In consideration of availability, stability, toxicity and corrosiveness, sulfuric acid is most preferred. If the reaction temperature is 100° C. or more, acetic acid used as the acetyl donor can function as the acid catalyst. The present invention includes the embodiment using acetic acid as the acid catalyst as well as the acetyl donor.

The amount of catalyst is determined according to the reaction temperature and the catalytic ability (acidity in the case of acidic catalyst).

The ripening step has usually been carried out in acetic acid (acetyl donor)-water (solvent) system. In a conventional ripening step, however, the amount of water is 10 mol % or more based on the amount of acetic acid. Under that condition, the decomposition of ester linkage in cellulose acetate predominantly proceeds, and consequently the degrees of substitution are lowered. Therefore, it is impossible to control properly the degrees of acetyl substitution at 2-, 3- and 6-positions under that conventional condition.

In the present invention, the amount of water and an alcohol is set to be less than 10 mol % (preferably, less than 7 mol %) based on the amount of acetyl donor, and thereby the degrees of acetyl substitution at 2-, 3- and 6-positions can be properly controlled.

Generally, an excess amount of acetic anhydride is used in the step for preparing cellulose acetate. The remaining acetic anhydride is preferably hydrolyzed into acetic acid before the ripening step, so that the ripening can be carried out without acetic anhydride.

The acetyl donor can function as a solvent at the ripening step. Therefore, it is not necessary to use another solvent. However, a liquid inactive to the reaction can be used as the solvent. The amount of the solvent other than the acetyl donor is preferably not more than five times the amount of the acetyl donor. The solvent other than the acetyl donor is selected from liquid dissolving cellulose acetate at the ripening step. Examples of the solvents include hydrocarbon halides (e.g., dichloromethane, chloroform, 1,1,2,2-tetrachloroethane), nitro compounds (e.g., nitromethane, nitrobenzene), sulfones (e.g., sulfolane) and ethers (e.g., dioxane).

In the case that an acid catalyst (e.g., sulfonic acid, perchloric acid, sulfuric acid) is used, the amount of the acid catalyst at the ripening step is preferably in the range of 0.1 to 10 mol %, and more preferably in the range of 0.2 to 2 mol % based on the amount of the acetyl donor. At the ripening step, the amount of the catalyst is essentially not changed within the above-mentioned preferred range.

The ripening temperature is preferably in the range of 20 to 125° C., and more preferably in the range of 30 to 70° C.

The ripening time is preferably in the range of 10 minutes to 10 hours, and more preferably in the range of 30 minutes to 3 hours.

The amount of water and alcohol (X) based on the acetyl donor, the amount of the catalyst (Y) based on the acetyl donor, the ripening temperature (T) and the ripening time (t) are preferably adjusted as important reaction conditions. The relation among the conditions is also preferably adjusted to obtain an appropriate equilibrium between the acetyl donor and cellulose acetate. For the purpose of that, the ripening condition are preferably so controlled that the reaction parameter (R) defined by the following formula is more than 20. The reaction parameter (R) is more preferably more than 30, and most preferably more than 40.

$$R(\text{Reaction parameter})=YZ/Xdt$$

In the formula, X is the molar ratio (%) of water and an alcohol based on the amount of the acetyl donor, Y is the molar ratio (%) of the catalyst based on the amount of the acetyl donor, Z is the temperature reduction coefficient ($3^{(T-30)/20}$ in which T is the reaction temperature (° C.)), and t is the reaction time (unit: minute). In the case where X is less than 0.1 mol %, X is regarded as 0.1 to calculate the R.

(Intermolecular Substitution Degree of Cellulose Acetate)

The process according to the present invention can form cellulose acetate in which an intermolecular acetyl substitution is uniform.

Cellulose acetate having a uniform degree of acetyl substitution can be purified (for example by a chromatography) from cellulose acetate having different degrees of acetyl substitution. However, cellulose acetate having a uniform degree of acetyl substitution is preferably obtained in a more economical way, in which cellulose acetate can be directly synthesized by improving the process as is mentioned above.

The average degree of acetyl substitution is preferably in the range of 2.636 to 2.958.

The degree of acetyl substitution can be measured by NMR according to a method of Tezuka (Carbohydr. Res., 273, 83 (1995)). Free hydroxyl groups in a cellulose acetate sample are reacted with propionic anhydride to form propionate ester in pyridine. The obtained sample is dissolved in chloroform-$d_1$, and the spectrum of carbon-13 is measured. The acetyl carbon signals are shown in the range of 169 ppm to 171 ppm in the order of 2-, 3- and 6-positions from a higher magnetic field. The propionyl carbon signals are shown in the range of 172 ppm to 174 ppm in the same order. The ratio of acetyl to propionyl at the corresponding position can give the degree of acetylation in the original cellulose acetate.

The average degree of acetyl substitution of cellulose acetate has conventionally determined from a value of acetic acid content, which can be measured according to ASTM-D-817-91 (testing method for cellulose acetate or the like). The acetic acid content obtained according to ASTM can be converted into the degree of substitution according to the following formula.

$$DS=162\times AV\times 0.01/(60-40\times AV\times 0.001)$$

In the formula, DS is the degree of acetyl substitution, and AV is the acetic acid content (%).

The calculated degree of substitution may usually be somewhat different from the value measured by NMR described above. If the values are different from each other, the value measured by NMR is prior to the ASTM value. If the values measured by various NMR methods are different from each other, the value measured according to the method of Tezuka is prior to the other values.

In the present specification, the uniform intermolecular degree of acetyl substitution means that cellulose acetate shows a distribution curve of an intermolecular substitution degree in which the maximum peak has a half width of less than 0.080, or has a half width of less than Y defined in the following formula:

$$Y=-0.17788X+0.5788$$

in which X is the degree of acetyl substitution.

The cellulose acetate most preferably shows a distribution curve of an intermolecular substitution degree in which the maximum peak has a half width of less than 0.080 and less than Y defined in the formula.

The distribution curve of an intermolecular substitution degree of cellulose acetate can be obtained by converting the abscissa (the horizontal axis) of an elution curve (elution time) to the degree of acetyl substitution (0 to 3). The elution curve is measured by a reverse phase HPLC.

The conditions of the reverse phase HPLC are shown below.

| | |
|---|---|
| Eluent: | Linear gradient by 28 minutes from chloroform/methanol (9/1, v/v)):methanol/water (8/1, v/v) = 20:80 to chloroform/methanol (9/1, v/v) = 100 |
| Column: | Nova Packphenyl of 3.9 × 150 mm (Waters) |
| Column temperature: | 30° C. |
| Flow rate: | 0.7 ml per minute |
| Conc. of sample: | 2 mg per ml |
| Injected amount: | 20 μl |
| Detector: | Evaporative light scattering detector (ELSD-MK-III, Varex) |
| Drift tube temp.: | 80° C. |
| Gas flow: | 2.1 SLPM |

Before the elution curve is converted into the distribution curve of an intermolecular substitution degree, at least four samples having different substitution degrees are measured under the same conditions to determine elution time. A formula of converting the elution time (T) to the degree of substitution (DS) can be obtained from the determined elution time. The relation between the elution time (T) and the degree of substitution (DS) can give a calibration curve according to the least squares method. The function is usually given in a secondary formula shown below.

$$DS=aT^2+bT+c$$

In the formula, DS is the degree of acetyl substitution, T is the elution time, and a, b and c are coefficients of the conversion formula.

FIG. 1 is a graph showing a distribution curve of an intermolecular substitution degree of cellulose acetate prepared in Example 4.

Figure 2:
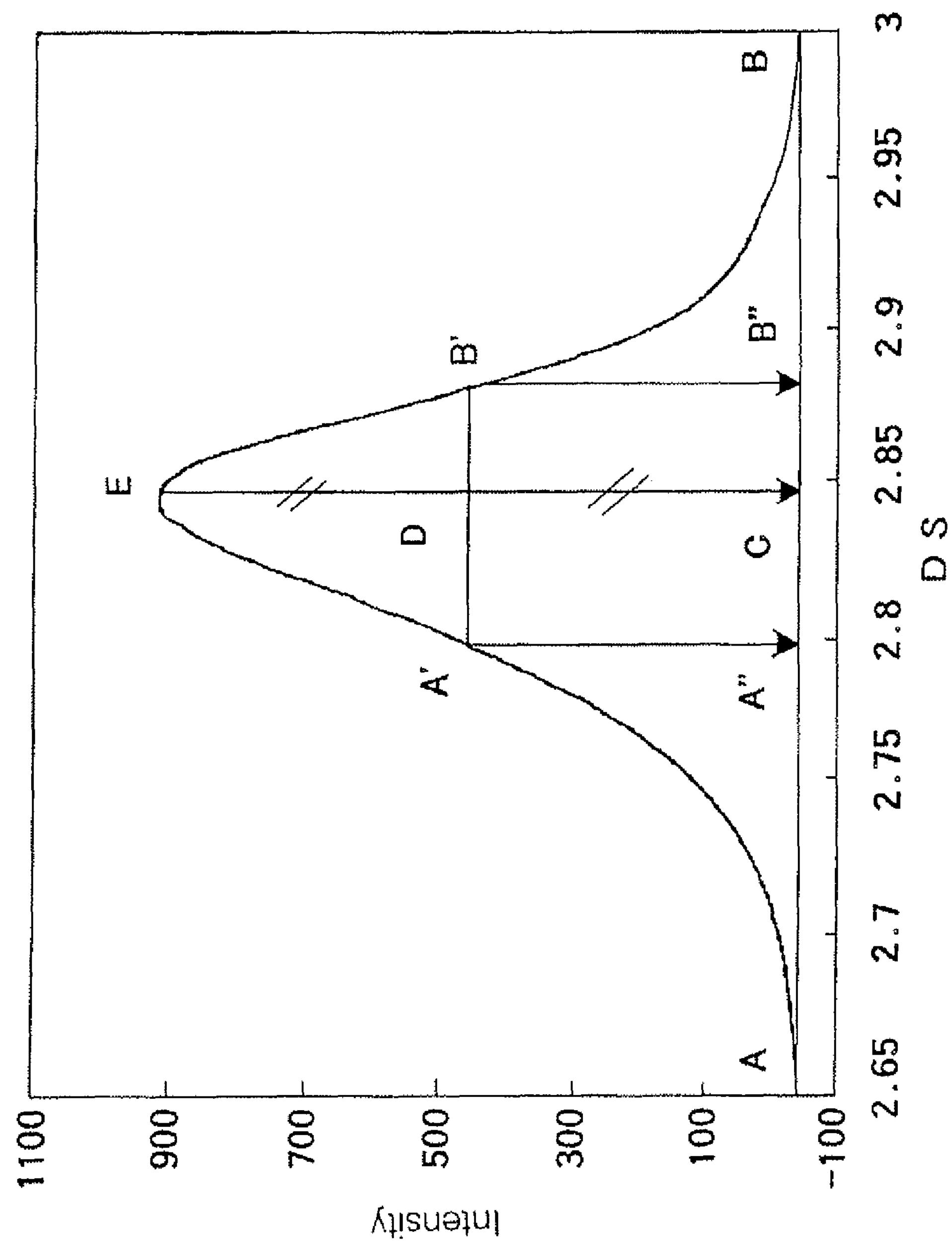
FIG. 2 is a graph showing a distribution curve of an intermolecular substitution degree of cellulose acetate prepared in Comparison Example 4.

FIG. 2 is a graph showing a distribution curve of an intermolecular substitution degree of cellulose acetate prepared in Comparison Example 4.

The DS of the abscissa (the horizontal axis) in FIGS. 1 & 2 means the degree of acetyl substitution. The intensity of the ordinate (the vertical axis) in FIGS. 1 & 2 means the amount of cellulose acetate having the degree of acetyl substitution corresponding to the abscissa.

The distribution curve of an intermolecular substitution in FIG. 1 shows the maximum peak (E) at the degree of substitution of 2.795. The distribution curve of an intermolecular substitution in FIG. 2 shows the maximum peak (E) at the degree of substitution of 2.851.

A base line (A-B) tangent is drawn from the base point (A) on the low substitution degree side to the base point (B) on the high substitution degree side. Independently, a line perpendicular to the horizontal axis is drawn from the maximum peak (E) of the curve to determine the intersection (C) of the perpendicular line and the base line (A-B). The midpoint (D) between the peak (E) and the intersection (C) is then determined. A line including the midpoint (D) is drawn parallel to the base line (A-B) to determine two intersections (A', B') of the line and the distribution curve of the intermolecular substitution. From each of the intersections (A', B'), a line perpendicular to the horizontal axis is drawn. The interval between the feet of the thus-drawn perpendiculars is defined as the half-width of the maximum peak.

(Intramolecular Substitution Degree of Cellulose Acetate)

The process according to the present invention can also form cellulose acetate in which degrees of acetyl substitution at 2-, 3- and 6-positions are properly controlled.

A cellulose acetate film having preferable properties and optical characters can be made of cellulose acetate in which the degrees of acetyl substitution at 2-, 3- and 6-positions satisfy the following formulas (I) to (III).

$$2DS+3DS<6DS\times 4-1.70 \quad (I)$$

$$2DS+3DS<-6DS\times 4+5.70 \quad (II)$$

$$2DS+3DS>1.80 \quad (III)$$

In the formulas (I) to (III), 2DS is the degree of acetyl substitution at 2-position, 3DS is the degree of acetyl substitution at 3-position, and 6DS is the degree of acetyl substitution at 6-position.

The degrees of acetyl substitution at 2-, 3- and 6-positions also preferably satisfy the following formula (VI)

$$2DS+3DS-6DS<1 \quad (VI)$$

In the formula (VI), 2DS is the degree of acetyl substitution at 2-position, 3DS is the degree of acetyl substitution at 3-position, and 6DS is the degree of acetyl substitution at 6-position.

The degrees of acetyl substitution at 2- and 3-positions further preferably satisfy the following formula (VII), and furthermore preferably satisfy the following formula (VIII).

$$2DS+3DS>1.82 \quad \text{(VII)}$$

$$2DS+3DS>1.84 \quad \text{(VIII)}$$

Figure 3:
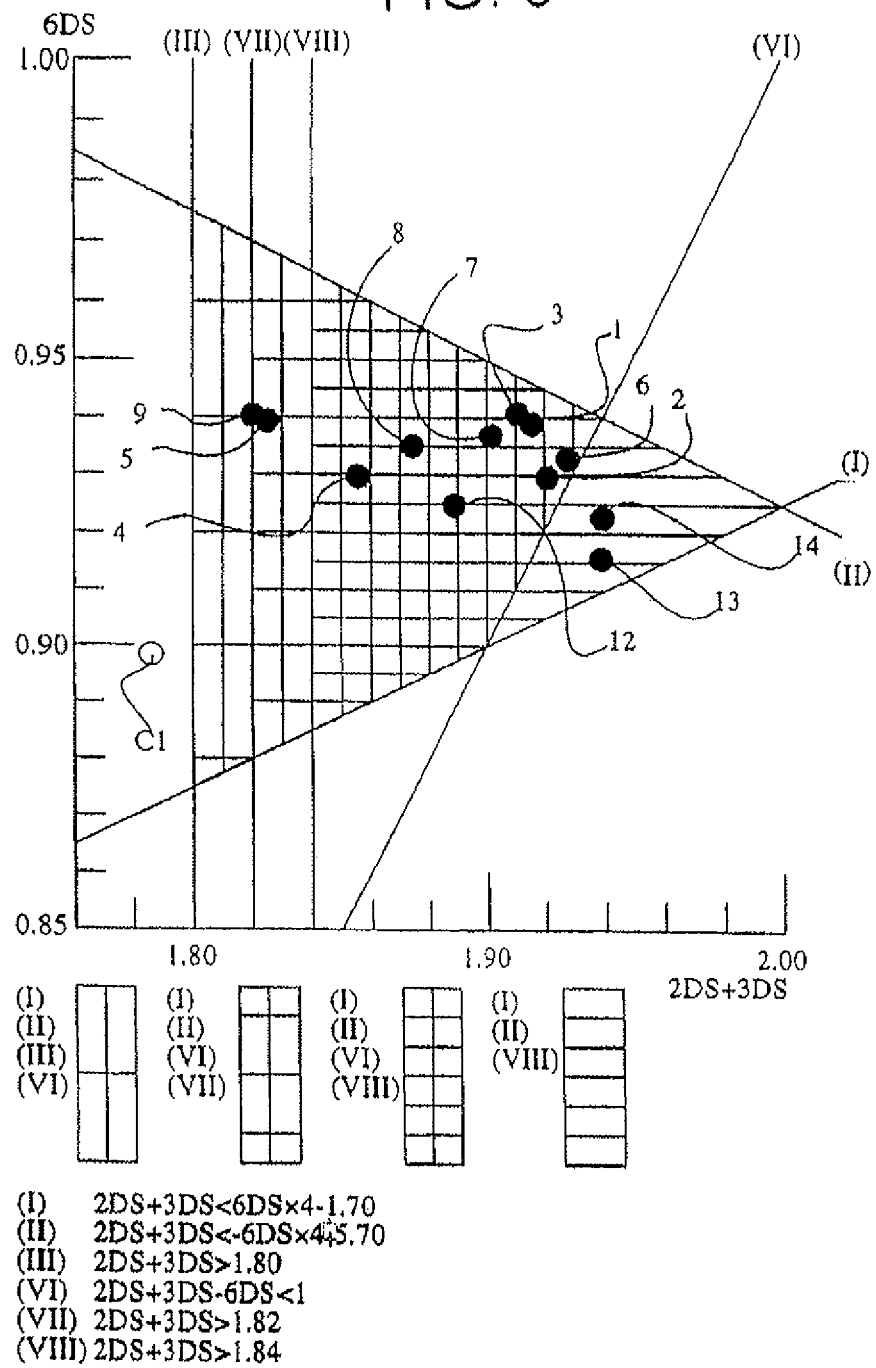
FIG. 3 is a graph showing degrees of acetyl substitution regulated by the formulas (I) to (III) and (VI) to (VIII), and also shows the degrees of acetyl substitution of cellulose acetates in Examples 1 to 9, 12 to 14 and Comparison Example 1.

FIG. 3 is a graph showing the conditions of degrees of acetyl substitution regulated by the formulas (I) to (III), (VI) to (VIII), and the graph also shows the degrees of acetyl substitution of cellulose acetates in Examples 1 to 9, 12 to 14 and Comparison Example 1. In the graph, the sum of the degrees of acetyl substitution at 2- and 3-positions (2DS and 3DS) are plotted on the abscissa (the horizontal axis), and the degree of acetyl substitution at 6-position (6DS) is plotted on the ordinate (the vertical axis).

Cellulose acetate satisfying the formula (I) is shown in the area below the line of (I) in FIG. 3 in which 2DS+3DS=6DS×4−1.70.

Cellulose acetate satisfying the formula (II) is shown in the area above the line of (II) in FIG. 3 in which 2DS+3DS=−6DS×4+5.70.

Cellulose acetate satisfying the formula (III) is shown in the area at the right side of the line of (III) in FIG. 3 in which 2DS+3DS=1.80.

Cellulose acetate satisfying the formula (VI) is shown in the area at the left side of the line of (VI) in FIG. 3 in which 2DS+3DS−6DS=1.

Cellulose acetate satisfying the formula (VII) is shown in the area at the right side of the line of (VII) in FIG. 3 in which 2DS+3DS=1.82.

Cellulose acetate satisfying the formula (VIII) is shown in the area at the right side of the line of (VIII) in FIG. 3 in which 2DS+3DS=1.84.

The solid circles 1 to 9 and 12 to 14 correspond to Examples 1 to 9 and 12 to 14, respectively. The open circle C1 corresponds to Comparison Example 1. Cellulose acetate of Comparison Example 2 is out of the range shown in the graph.

A cellulose acetate solution whose solubility and viscosity are easily controlled can be prepared from the cellulose acetate in which the degrees of acetyl substitution at 2-, 3- and 6-positions satisfy the following formulas (III) to (V):

$$2DS+3DS>1.80 \quad \text{(III)}$$

$$3DS<2DS \quad \text{(IV)}$$

$$6DS>0.80 \quad \text{(V)}$$

In the formulas (III) to (V), 2DS is the degree of acetyl substitution at 2-position, 3DS is the degree of acetyl substitution at 3-position, and 6DS is the degree of acetyl substitution at 6-position.

The degrees of acetyl substitution at 2- and 3-positions further preferably satisfy the following formula (VII), and furthermore preferably satisfy the following formula (VIII).

$$2DS+3DS>1.82 \quad \text{(VII)}$$

$$2DS+3DS>1.84 \quad \text{(VIII)}$$

The degrees of acetyl substitution at 2- and 3-positions also preferably satisfy the following formula (X).

$$3DS>2DS\times2-1 \quad \text{(X)}$$

Figure 4:
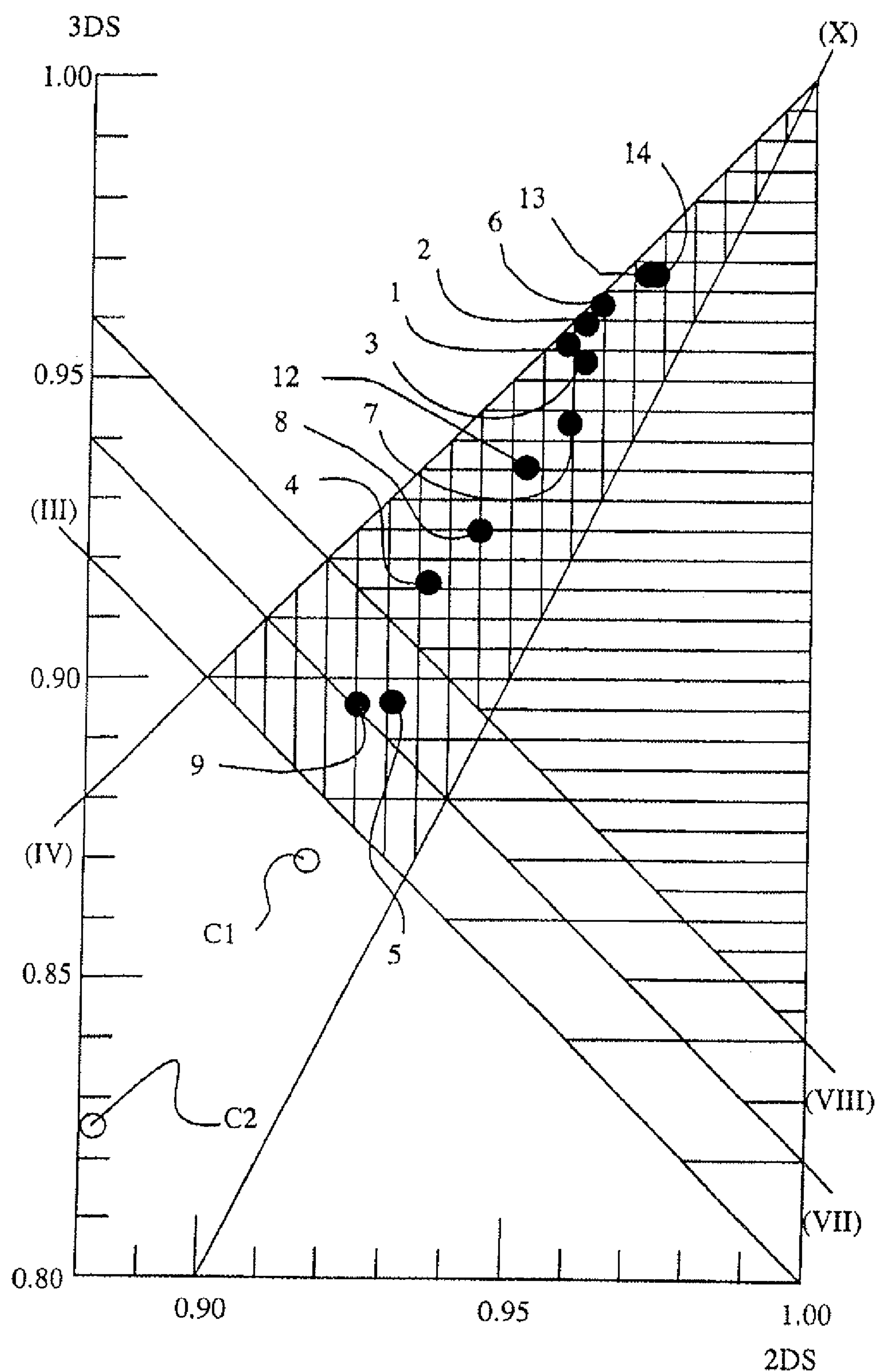
FIG. 4 is a graph showing degrees of acetyl substitution regulated by the formulas (III), (IV), (VII), (VIII) and (X), and also shows the degrees of acetyl substitution of cellulose acetates in Examples 1 to 9, 12 to 14 and Comparison Examples 1 and 2.

FIG. 4 is a graph showing the conditions of degrees of acetyl substitution regulated by the formulas (III), (IV), (VII), (VIII) and (X), and also shows the degrees of acetyl substitution of cellulose acetates in Examples 1 to 9, 12 to 14 and Comparison Examples 1 and 2. In the graph, the degree of acetyl substitution at 2-positions (2DS) is plotted on the abscissa (the horizontal axis), and the degree of acetyl substitution at 3-position (3DS) is plotted on the ordinate (the vertical axis).

Cellulose acetate satisfying the formula (III) is shown in the area above the line of (III) in FIG. 4 in which 2DS+3DS=1.80.

Cellulose acetate satisfying the formula (IV) is shown in the area below the line of (IV) in FIG. 4 in which 3DS=2DS.

Cellulose acetate satisfying the formula (VII) is shown in the area above the line of (VII) in FIG. 4 in which 2DS+3DS=1.82.

Cellulose acetate satisfying the formula (VIII) is shown in the area above the line of (VIII) in FIG. 4 in which 2DS+3DS=1.84.

Cellulose acetate satisfying the formula (X) is shown in the area at the left side of the line of (X) in FIG. 4 in which 3DS=2DS×2−1.

The solid circles 1 to 5 and 7 to 10 correspond to Examples 1 to 5 and 7 to 10, respectively. The open circles C1 and C2 correspond to Comparison Examples 1 and 2, respectively.

Cellulose acetate preferably satisfies at least four formulas, more preferably satisfies at least five formulas, further preferably satisfies at least six formulas, furthermore preferably satisfies at least seven formulas, and most preferably satisfies at least eight formulas of (I) to (X). Cellulose acetate particularly preferably satisfies all the formulas (I) to (X).

The degrees of acetyl substitution at 2-, 3- and 6-positions can be determined by means of $^{13}$C-NMR after the cellulose acetate is subjected to a process of forming propionate ester. The measurement of degrees of acetyl substitution is described in detail in Tezuka et al. (Carbohydr. Res., 273, 83-91 (1995)).

[Infrared Absorption Spectrum]

The process according to the present invention can also form cellulose acetate, which shows an infrared absorption spectrum in which an absorption maximum having a half width of 135 $cm^{-1}$ or less is in the wave number range of 3450 to 3550 $cm^{-1}$. The absorption maximum is more preferably in the range of 3455 to 3540 $cm^{-1}$, and further preferably in the range of 3460 to 3530 $cm^{-1}$. The half width of the absorption maximum is more preferably 130 $cm^{-1}$ or less, and further preferably 125 $cm^{-1}$ or less.

The infrared absorption spectrum of cellulose acetate is measured in the form of a film, which is formed by the solvent cast method. Concrete procedures of the measurement are described in Example 6.

From the measured spectrum (ordinate: absorbance), the position and the half-width of the absorption maximum are obtained. The analysis of the infrared absorption spectrum is described in "Kobunshi no Kozo (Structure of polymer), written in Japanese", H. Tadokoro, (1976), 219-221, Kagaku-Dojin.

Figure 5:
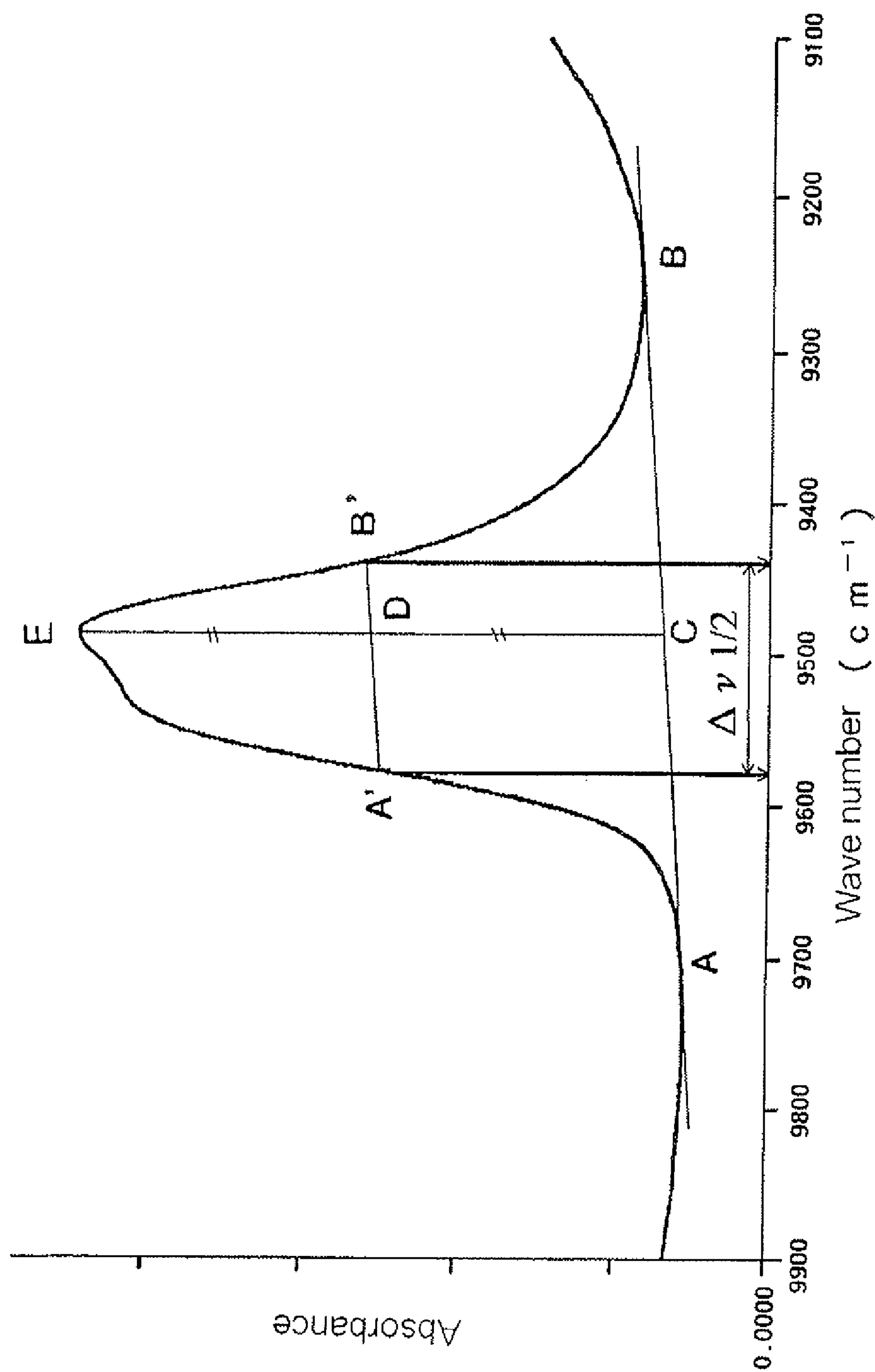
FIG. 5 is a spectrum showing a half-width of the absorption maximum in an infrared absorption spectrum.

FIG. 5 is a spectrum showing a half-width of the absorption maximum in an infrared absorption spectrum.

In the spectrum in FIG. 5, there is an absorption band attributed to hydroxyl at about 3500 $cm^{-1}$. The half-width is obtained in the following manner. First, a base line (A-B) tangent to both of the base point (A) on the higher energy side (at about 3700 $cm^{-1}$) and the base point (B) on the lower energy side (at about 3250 $cm^{-1}$) is drawn. Independently, a line perpendicular to the horizontal axis is drawn from the peak (E) of the band so as to determine the intersection (C) of the perpendicular and the base line (A-B). The midpoint (D) between the peak (E) and the intersection (C) is then determined, and a line including the midpoint (D) is drawn parallel to the base line (A-B) to determine intersections (A', B') of the line and the spectrum. From each of the intersections (A', B'), a line perpendicular to the horizontal axis is drawn. The interval between the feet of the thus-drawn perpendiculars is defined as the half-width ($\Delta\nu_{1/2}$).

If the absorption band has two or more peaks in the range of 3459 to 3550 $cm^{-1}$, the maximum peak is regarded as the peak of the band (E in FIG. 5).

The infrared absorption spectrum of methylcellulose is described in "Cellulose", 4, 281 (1997), Kondo et al.

It is also preferred for an already produced cellulose acetate film (such as a film product)) to show an infrared absorption spectrum in which an absorption maximum having a half width of 135 $cm^{-1}$ or less is in the range of 3450 to 3550 $cm^{-1}$. In that case, since additives (for example, ultraviolet absorbers) often affect the spectrum, the absorption spectrum attributed to cellulose acetate itself is selectively measured.

(Organic Solvent)

Cellulose acetate is usually dissolved in an organic solvent to prepare a cellulose acetate solution, from which various products (e.g., film) are produced. Examples of the organic solvent include ketones, esters, ethers, hydrocarbons and alcohols.

Although halogenated hydrocarbons such as methylene chloride are also usable from the technical viewpoint, they are not preferred in consideration of the environment. The organic solvent, therefore, preferably contains halogenated hydrocarbons in an amount of less than 5 wt. % (more preferably less than 2 wt. %). It is also preferred that no halogenated hydrocarbon be found in the produced cellulose acetate film.

The organic solvent preferably contains a solvent selected from the group consisting of an ether having 2 to 12 carbon atoms, a ketone having 3 to 12 carbon atoms and an ester having 2 to 12 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 2 to 12 carbon atoms include dimethyl ether, methyl ethyl ether, diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methyl ethyl ketone, diethyl ketone, diisobutyl ketone, cyclohexanone, methylcyclohexane and acetylacetone.

Examples of the ester having 2 to 12 carbon atoms include methyl formate, ethyl formate, propyl formate, pentyl formate, methyl acetate, ethyl acetate and pentyl acetate. An organic solvent containing methyl acetate in an amount of 50 wt. % or more is particularly preferably used.

Examples of the compound having two or more functional groups include 2-ethoxyethyl acetate, 2-methoxy ethanol and 2-butoxy ethanol.

A particularly preferred solvent is a mixture of three different kinds of solvents. In the mixture, the first solvent is a ketone having 3 to 12 carbon atoms or an ester having 2 to 12 carbon atoms, the second solvent is a monovalent straight-chained alcohol having 1 to 5 carbon atoms, and the third solvent is an alcohol having a boiling point of 30 to 170° C. or a hydrocarbon having a boiling point of 30 to 170° C.

The ketone or ester used as the first solvent is the same as that described above. The first solvent may be a mixture thereof. For example, a mixture of ketone (e.g., acetone) and ester (e.g., methyl acetate) can be used as the first solvent.

The second solvent is a monovalent straight-chained alcohol having 1 to 5 carbon atoms. In the alcohol, hydroxyl may be connected to either the terminal of the straight hydrocarbon chain (i.e., primary alcohol) or the middle of the chain (i.e., secondary alcohol). Examples of the alcohol for the second solvent include methanol, ethanol, 1-propanol, 2-propanol, 1-butanol, 2-butanol, 1-pentanol, 2-pentanol and 3-pentanol. The number of carbon atoms in the alcohol is preferably 1 to 4, more preferably 1 to 3, and most preferably 1 or 2. Ethanol is particularly preferred.

The third solvent is an alcohol having a boiling point of 30 to 170° C. or a hydrocarbon having a boiling point of 30 to 170° C. The alcohol is preferably monovalent. The hydrocarbon moiety of the alcohol may have a straight chain structure, a branched chain structure or a cyclic structure. The hydrocarbon moiety is preferably a saturated aliphatic hydrocarbon. The alcohol for the third solvent may be a primary alcohol, a secondary alcohol or a tertiary alcohol.

Examples of the alcohol for the third solvent include methanol (boiling point: 64.65° C.), ethanol (boiling point: 78.325° C.), 1-propanol (boiling point: 97.15° C.), 2-propanol (boiling point: 82.4° C.), 1-butanol (boiling point: 117.9° C.), 2-butanol (boiling point: 99.5° C.), t-butyl alcohol (boiling point: 82.45° C.), 1-pentanol (boiling point: 137.5° C.), 2-methyl-2-butanol (boiling point: 101.9° C.), cyclohexanol (boiling point: 161° C.), 2-fluoroethanol (boiling point: 103° C.), 2,2,2-trifluoroethanol (boiling point: 80° C.), 2,2,3,3-tetrafluoro-1-propanol (boiling point: 109° C.), 1,3-difluoro-2-propanol (boiling point: 55° C.), 1,1,1,3,3,3-hexafluoro-2-methyl-2-propanol (boiling point: 62° C.), 1,1,1,3,3,3-hexafluoro-2-propanol (boiling point: 59° C.), 2,2,3,3,3-pentafluoro-1-propanol (boiling point: 80° C.), 2,2,3,4,4,4-hexafluoro-1-butanol (boiling point: 114° C.) 2,2,3,3,4,4,4-heptafluoro-1-butanol (boiling point: 97° C.), perfluoro-tert-butyl alcohol (boiling point: 45° C.), 2,2,3,3,4,4,5,5-octafluoro-1-pentanol (boiling point: 142° C.), 2,2,3,3,4,4-hexafluoro-1,5-pentanediol (boiling point: 111.5° C.), 3,3,4,4,5,5,6,6,7,7,8,8,8-tridecafluoro-1-octanol (boiling point: 95° C.), 2,2,3,3,4,4,5,5,6,6,7,7,8,8,8-pentadecafluoro-1-octanol (boiling point: 165° C.), 1-(pentafluorophenyl)ethanol (boiling point: 82° C.) and 2,3,4,5,6-pentafluorobenzyl alcohol (boiling point: 115° C.).

The alcohol for the third solvent is defined as the same as that for the second solvent described above. However, the alcohol for the third solvent is selected so that it may be different from the alcohol for the second solvent. For example, if ethanol is used as the second solvent, other alcohols defined in the description for the second solvent (e.g., methanol, 1-propanol, 2-propanol, 1-butanol, 2-butanol, 1-pentanol, 2-pentanol and 3-pentanol) can be used as the third solvent.

The hydrocarbon for the third solvent may have a straight chained, branched chained or cyclic structure. The hydrocarbon may be either aliphatic or aromatic. If it is aliphatic, the hydrocarbon may be either saturated or unsaturated.

Examples of the hydrocarbon include cyclohexane (boiling point: 80.7° C.), hexane (boiling point: 69° C.), benzene (boiling point: 80.1° C.), toluene (boiling point: 110.6° C.) and xylene (boiling point: 138.4 to 144.4° C.).

In the mixed solvent of three different kinds of solvents, the content of the first solvent is preferably in the range of 50 to 95 wt. %, more preferably in the range of 60 to 92 wt. %, further preferably in the range of 65 to 90 wt. %, and most preferably in the range of 70 to 88 wt. %. The content of the second solvent is preferably in the range of 1 to 30 wt. %, more preferably in the range of 2 to 27 wt. %, further preferably in the range of 3 to 24 wt. %, and most preferably in the range of 4 to 22 wt. %. The content of the third solvent is preferably in the range of 1 to 30 wt. %, more preferably in the range of 2 to 27 wt. %, further preferably in the range of 3 to 24 wt. %, and most preferably in the range of 4 to 22 wt. %.

To the mixed solvent, another organic solvent is added so as to prepare a mixed solvent of four solvents. In that case, the fourth solvent is preferably selected from the three kinds of solvents described above. Further, ethers having 3 to 12 carbon atoms (e.g., diisopropyl ether, dimethoxyethane, diethoxyethane, 1,4-dioxane, 1,3-dioxofuran, tetrahydrofuran, anisole, phenetole) and nitromethane can be used besides the above three kinds of solvents.

The organic solvent has a boiling point preferably in the range of 20 to 300° C., more preferably in the range of 30 to 200° C., further preferably in the range of 40 to 100° C., and most preferably in the range of 50 to 80° C.

Into the above organic solvent, cellulose acetate is dissolved preferably by the cooling dissolution method. The cooling dissolution method comprises a swelling step, a cooling step and a warming step. Even if cellulose acetate can be dissolved in a solvent at room temperature, the cooling dissolution method makes it possible to prepare a homogeneous solution rapidly.

(Swelling Step)

At the first step, cellulose acetate is mixed with a solvent to swell the polymer in the solvent. The swelling step is preferably conducted at a temperature of −10 to 55° C. The swelling step is usually conducted at room temperature.

The ratio of cellulose acetate to the mixture is determined depending on a concentration of a solution to be obtained. The amount of cellulose acetate in the mixture is preferably in the range of 5 to 30 wt. %, more preferably in the range of 8 to 20 wt. %, and most preferably in the range of 10 to 15 wt. %.

The mixture of cellulose acetate and the solvent is preferably stirred until the cellulose acetate is enough swelled. The stirring time is preferably in the range of 10 to 150 minutes, and more preferably in the range of 20 to 120 minutes.

At the swelling step, additives such as a plasticizer, a deterioration inhibitor, a dye and an ultraviolet absorbent can be added to the mixture.

(Cooling Step)

At the next step, the swelled mixture is cooled to a temperature of −100 to −10° C. The swelled mixture preferably solidifies at the cooling step.

The cooling rate is preferably 4° C. per minute or more, more preferably 8° C. per minute or more, and most preferably 12° C. per minute or more. The cooling rate is preferably as fast as possible. However, a theoretical upper limit of the cooling rate is 10,000° C. per second, a technical upper limit is 1,000° C. per second, and a practical upper limit is 100° C. per second.

The cooling rate means the change of temperature at the cooling step per the time taken to complete the cooling step. The change of temperature means the difference between the temperatures at which the cooling step is started and at which the cooling step is completed. The cooling rate in the examples of Japanese patent Provisional publication Nos. 9 (1997)-95544, 9 (1997)-95557 and 9 (1997)-95538 is about 3° C. per minute.

The mixture is preferably cooled in a sealed vessel to prevent contamination of water, which may be caused by dew condensation at the cooling step. Further, the mixture may be cooled under a reduced pressure, and thereby the time taken to complete the cooling step can be shortened. A vessel resisting pressure is preferably used to conduct the procedures under a reduced pressure.

Various methods and apparatus can be used to perform the cooling step.

For example, the swelled mixture is conveyed while stirred into a cylinder, which is then cooled from the outside, and thereby the mixture is rapidly and homogeneously cooled. For this procedure, an apparatus comprising a cylindrical vessel, a screw conveyer which transports the mixture while stirring into the vessel and a cooling means provided around the vessel is preferably used.

A supplemental solvent beforehand cooled at a temperature of −105 to −15° C. may be added to the swelled mixture, so as to cool more quickly.

Further, the swelled mixture can be cooled further quickly by extruding the mixture into a liquid beforehand cooled at a temperature of −100 to −10° C. The extruded mixture is in the form of fiber having a diameter in the range of 0.1 to 20.0 mm. There is no specific limitation with respect to the liquid for cooling the mixture.

If the swelled mixture is extruded into the cooled liquid, the extruded mixture in the form of fiber is preferably separated from the cooled liquid after the cooling step and before the warming step.

The extruded mixture usually solidifies to gel at the cooling step, and hence it is easy to separate the solid fiber from a liquid. For example, the solid fiber in the liquid can be taken out in a net. A board having small holes or slits can be used in place of the net. The net or the board is made of a plastic or metal that is not dissolved in the cooled liquid. The mesh of the net, the diameter of the hole or the width of the slit should be adjusted to the diameter of the fiber to prevent the fiber from passing through the net or the board. Further, the conveyer may be made of a net so as to separate the fiber from the liquid while transporting the fiber from a cooling device to a warming device.

(Warming Step)

The cooled mixture is warmed to a temperature of 0 to 200° C. The temperature of the obtained solution after the warming step is usually room temperature.

The warming rate is 4° C. per minute or more, more preferably 8° C. per minute or more, and most preferably 12° C. per minute or more. The warming rate is preferably as fast as possible. However, a theoretical upper limit of the cooling rate is 10,000° C. per second, a technical upper limit is 1,000° C. per second, and a practical upper limit is 100° C. per second.

The warming rate means the change of temperature at the warming step per the time taken to complete the warming step. The change of temperature means the difference between the temperature at which the warming step is started and the temperature at which the warming step is completed. The warming rate in the examples of Japanese patent Provisional publication Nos. 9 (1997)-95544, 9 (1997)-95557 and 9 (1997)-95538 is about 3° C. per minute.

The mixture may be warmed under an increased pressure, and thereby the time taken to complete the warming step can be shortened. A vessel resisting pressure is preferably used to conduct the procedures under an increased pressure.

Various methods and apparatus can be used to perform the warming step.

For example, the swelled mixture is conveyed while stirred into a cylinder, which is then warmed from the outside, and thereby the mixture is rapidly and homogeneously warmed. For this procedure, an apparatus comprising a cylindrical vessel, a screw conveyer which transports the mixture while stirring into the vessel and a warming means provided around the vessel is preferably used.

The swelled mixture can be warmed further quickly by extruding the mixture into a liquid beforehand warmed. The extruded mixture is in the form of fiber having a diameter in the range of 0.1 to 20.0 mm. There is no specific limitation with respect to the liquid for warming the mixture.

If the mixture is extruded in the form of a fiber at the cooling step, the cooled fiber is immersed in the beforehand warmed liquid at the warming step. If the cooling step is conducted by other procedures, the cooled mixture is extruded in the form of a fiber into the warmed liquid. If the extrusion into a fiber is successively performed, the produced cellulose acetate solution can be used as the liquid for warming the next swelled mixture. In that case, the swelled mixture in the form of a fiber is immersed into a warm cellulose acetate solution produced before, so as to warm the mixture rapidly to prepare a new cellulose acetate solution, which is then used as the liquid for warming the next mixture.

Further, the cooled swelled mixture may be introduced into a cylindrical vessel, in which the flow of the mixture is repeatedly divided and rotated. While repeatedly divided and rotated, the mixture is warmed from the outside of the vessel. The vessel having a partition by which the flow of the mixture is divided and rotated is generally known as a static mixer. For example, in a typical static mixer (TM, Kenix), two elements are provided. One of them divides the mixture into two flows, and rotates the flows counterclockwise (counterclockwise element) by 180°. The other divides the mixture into two flows, and rotates the flows clockwise (clockwise element) by 180°. Those elements are placed perpendicularly to each other.

The swelled mixture may be heated to a temperature above the boiling point of the solvent under a pressure controlled so that the solvent may not boil. The temperature is determined according to the solvent, but is generally in the range of 60 to 200° C. The pressure is determined in consideration of the temperature and the boiling point, but is generally in the range of 1.2 to 20 kgw/cm$^2$.

(Post Treatment after Preparation of Solution)

The prepared solution can be subjected to post treatment such as adjustment of concentration (or dilution), filtration, and adjustment of temperature or addition of components.

The additional components are determined according to use of cellulose acetate solution. Examples of the representative additives include a plasticizer, a deterioration inhibitor (e.g., a peroxide decomposer, a radical inhibitor, a metal inactivator, an acid scavenger), a dye and an ultraviolet absorbent. In this step, fine particles (preferably, fine particles dispersed in a diluted cellulose acetate solution) are preferably added.

(Fine Particles)

The cellulose acetate film of the invention can contain fine particles having a mean particle size of 1.0 μm or less. The fine particles function as a slipping agent, and improve the kinetic friction coefficient of the film.

The fine particles are preferably inorganic compounds. Examples of the inorganic compound include silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate. Preferred are silicon dioxide, titanium dioxide and zirconium oxide, and particularly preferred is silicon dioxide.

Onto the surface of the inorganic fine particles, methyl can be introduced through a surface treatment. For example, fine particles of silicon oxide are treated with dichlorodimethylsilane or bis(trimethylsilyl)amine.

Fine particles of silicon oxide are commercially available (e.g., Aerozil R972™, R972D™, R974™ and R812™, from Japan Aerozil Co., Ltd.). Fine particles of zirconium oxide are also commercially available (e.g., Aerozil R976™ and R811™, from Japan Aerozil Co., Ltd.).

The mean particle size of the fine particles is preferably 1.0 μm or less, more preferably in the range of 0.1 to 1.0 μm, and most preferably in the range of 0.1 to 0.5 μm.

The amount of the fine particles is preferably in the range of 0.005 to 0.3 wt. %, more preferably in the range of 0.01 to 0.1 wt. % based on the amount of cellulose acetate.

The fine particles may be added in any step of the film forming process described below. Preferably, a diluted solution analogous to the organic solution of cellulose acetate is prepared, and in the diluted solution the fine particles are dispersed. The thus-prepared dispersion and the organic solution of cellulose acetate are mixed, and from the mixture a film is prepared. Thus, a film containing the fine particles evenly dispersed can be obtained.

(Plasticizer)

The cellulose acetate film generally contains a plasticizer. As the plasticizer, phosphoric esters and carboxylic esters are used. Examples of the phosphoric esters include triphenyl phosphate, tricresyl phosphate, octyldiphenyl phosphate, triethyl phosphate and tributyl phosphate. Typical carboxylic esters are phthalic esters, citric esters, oleic esters and linoleic esters. Examples of the phthalic esters include dimethyl phthalate, diethyl phthalate, dibutyl phthalate, dimethoxy phthalate, dioctyl phthalate and diethylhexyl phthalate. Examples of the citric esters include triethyl acetylcitrate and tributyl acetylcitrate. Examples of the oleic esters include butyl oleate. Examples of other carboxylic esters include ethylphthalylethyl glycolate, butylphthalylbutyl glycolate, triacetin, methylacetyl ricinolate, dibutyl sebacate and various trimellitic esters.

The amount of plasticizer is generally in the range of 0.1 to 40 wt. %, more preferably in the range of 1.0 to 20 wt. % based on the amount of cellulose acetate.

(Deterioration Inhibitor)

The cellulose acetate film preferably contains a deterioration inhibitor. Examples of the deterioration inhibitor include a peroxide decomposer, a radical inhibitor, a metal inactivator and an acid scavenger. The deterioration inhibitor is described in Japanese Patent Provisional Publication Nos. 3 (1991)-199201, 5 (1993)-1907073, 5 (1993)-194789, 5 (1993)-271471 and 6 (1994)-107854. A particularly preferred example of the deterioration inhibitor is butylated hydroxytoluene (BHT).

The amount of deterioration inhibitor is preferably in the range of 0.01 to 0.5 wt. %, more preferably in the range of 0.05 to 0.2 wt. % based on the amount of cellulose acetate.

(Ultraviolet Absorbent)

The cellulose acetate film may contain an ultraviolet absorbent, which improves aging stability of the film. The ultraviolet absorbent preferably has no absorption band in the visible wavelength region.

Examples of the ultraviolet absorbent include benzophenone compounds (e.g., 2,4-dihydroxybenzophenone, 2-hydroxy-4-methoxybenzophenone, 2-hydroxy-4-n-octoxybenzophenone, 4-dodecyloxy-2-hydroxy benzophenone, 2,2',4,4'-tetrahydroxybenzophenone, 2,2'-dihydroxy-4,4'-dimethoxybenzophenone), pentotriazole compounds (e.g., 2-(2'-hydroxy-5-methylphenyl)benzotriazole, 2-(2'-hydroxy-3',5'-di-t-butylphenyl)benzotriazole, 2-(2'-hydroxy- 3'-di-t-butyl-5'-methylphenyl)benzotriazole) and salicylic compounds (e.g., phenyl salicylate, methyl salicylate).

The amount of ultraviolet absorbent preferably in the range of 0.5 to 20 wt. %, more preferably in the range of 1 to 10 wt. % based on the amount of cellulose acetate film.

(Dye)

A dye may be incorporated into the cellulose acetate film, so as to prevent the light piping phenomenon.

The hue of the dye is preferably gray. A compound showing good heat resistance in the temperature range for preparing the cellulose acetate film and having good compatibility with cellulose acetate is preferably used as the dye.

Two or more dyes may be used in combination.

(Film Formation)

The process for preparing the organic solution of cellulose acetate (dope) according to the cooling dissolution method is very different from a usual process (in which a material mixture is only stirred at room temperature or elevated temperature) for preparing a solution for the solvent cast method. However, the step for forming a film from the prepared solution can be carried out in the same manner.

The cellulose acetate solution is cast on a support, and the solvent is evaporated to form a film. Before casting the solution, the concentration of the solution is preferably so adjusted that the solid content of the solution is in the range of 18 to 35 wt. %. The surface of the support is preferably polished to give a mirror plane. A drum or a band is used as the support. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45 (1970)-4554, 49 (1974)-5614, Japanese Patent Provisional Publication Nos. 60 (1985)-176834, 60 (1985)-203430 and 62 (1987)-115035.

Preferably, the cellulose acetate film formed on the support is peeled off before completely dried (while the organic solvent still remains in an amount of 30 wt. % or more based on the weight of the film), and then is further dried. For this procedure, the solution cast on the support must gel quickly. In promoting the gelation, a poor solvent such as alcohols (the above-described third solvent) is effective. The casting method can be modified to promote the gelation.

The solution is cast on the support beforehand cooled at 10° C. or below, and thereby the gelation is promoted (ref. Japanese Patent Publication No. 5 (1993)-17844). The support can be cooled with cooling media or cold air. In this cooling step, dry air may be blown over the support for 2 or more seconds to dry the film on the support. The formed film is peeled off the support, and can be further dried with air to remove the solvent remaining in the film. The temperature of the air can be gradually elevated from 100 to 160° C.

Otherwise, the solution is cast on the support beforehand warmed at 30° C. or more, and then the support is cooled to 20° C. or below. Through this procedure, the gelation can be also promoted (ref. Japanese Patent Provisional Publication Nos. 61 (1986)-148013 and 61 (1986)-158413). The support can be warmed with a heater provided on the surface of the support, or hot air may be blown over the support. Further, hot water may be circulated in the drum support to warm the film. It is preferred that the temperature be elevated immediately after the solution is cast on the support. At the beginning of warming, much latent heat is required because of evaporation of the solvent. Accordingly, besides the above heating means, auxiliary heating means such as heaters (steam heater, IR heater) are preferably used to heat the support, or hot air is preferably blown over the bottom surface of the support at the beginning of warming. For cooling the support, the warmed support may be left to cool down. Otherwise, the support may be forced to cool down by blowing cold air or by circulating cold water.

Having excellent optical character and properties, the thus-formed cellulose acetate film can be widely used. The film of the invention is particularly effective in liquid crystal displays.

The cellulose acetate film may be subjected to AG (anti-glare) treatment or AR (anti-reflection) treatment. The AG treatment improves the transmittance of the film by about 3%. In the AR treatment, an anti-reflection film (consisting of one layer, two layers or three or more layers) is provided to lower loss by reflection. Materials for the anti-reflection film are described in 'Thin Film Handbook (written in Japanese)', Ohom-sha, December 10 (1983), 818-821.

(Protective Film for Polarizing Plate and Liquid Crystal Display)

The cellulose acetate film is particularly preferably used in a liquid crystal display as a protective film for polarizing plate or a phase retarder.

A liquid crystal display generally has a liquid crystal display device and a polarizing plate.

The liquid crystal display device comprises a liquid crystal layer, a substrate supporting the layer and an electrode layer which has a function of applying a voltage to the liquid crystal. The substrate and the electrode layer are made of transparent materials for displaying. As the transparent substrate, a glass thin plate or a resin film is used. If the device must have slight flexibility, a resin film must be used. In addition to high transparency, the transparent substrate must have a low birefringent index and a high heat-resistance. The device may have a phase retarder, which is a birefringent film for removing undesirable colors of displayed images. A resin film is also used as the phase retarder, but the phase retarder must have a high birefringent index The polarizing plate comprises a protective film and a polarizing membrane. The polarizing membrane is a resin film containing iodine and dichromatic dye for polarizing. The protective film is provided on one or each surface of the polarizing membrane for protection. In the case where the protective film is provided on only one surface of the membrane, the aforementioned substrate generally serves as a protective film for the other surface. Since the protective film must have a high transmittance and a low refringent index (a low retardation value), the cellulose acetate film of the invention is particularly advantageously used as the protective film.

As the polarizing membrane, an iodine polarizing membrane, a polyene polarizing membrane and a dichromatic dye polarizing membrane are known. Those are generally prepared from polyvinyl alcohol films.

The protective film for the polarizing plate has a thickness preferably in the range of 25 to 350 μm, more preferably in the range of 50 to 200 μm. The protective film may contain an ultraviolet absorbent, a slipping agent, a deterioration inhibitor or a plasticizer.

The surface of the protective film may be further covered with a surface treatment film, which works for hard coating, anti-fogging and anti-glare.

The polarizing plate and the protective film thereof are described in Japanese Patent Provisional publication Nos. 4 (1992)-219703, 5 (1993)-212828 and 6 (1994)-51117.

Example 1

Synthesis of Cellulose Acetate

Wood pulp (water content: 7.31 wt. %) containing α-cellulose in the amount of about 97 wt. % was broken into pieces.

To 302.1 g of the pulp, 140 g of glacial acetic acid was evenly sprinkled. The resulting mixture was then stirred. After left at room temperature for 90 minutes, the mixture was poured into another mixture of 769.7 g of cooled acetic anhydride, 1170.3 g of acetic acid and 23.08 g of 98% sulfuric acid. The temperature of the obtained mixture was linearly elevated for 60 minutes from 0° C. (when the reaction was started) to 37° C. The temperature was then kept at 37° C. for 90 minutes, to synthesize cellulose acetate.

(Ripening of Cellulose Acetate)

To a solution of the above-prepared cellulose acetate, 62.05 g of 26 wt. % aqueous solution of acetic acid was added. The mixture was heated to 47° C., and kept at the temperature for 90 minutes to ripen the cellulose acetate. The amounts of acetic acid (acetyl donor), water and sulfuric acid (catalyst) in the mixture were 1,658 weight parts, 23.3 weight parts and 22.6 weight parts, respectively, based on 499 weight parts of cellulose acetate. Accordingly, the ratio of water to acetic acid (acetyl donor) was 4.68 mol. %.

The reaction parameter (R=YZ/Xdt) in this ripening step was calculated and found 41.

(Post Treatment)

After the ripening step was completed, 188 g of 24 wt. % aqueous solution of magnesium acetate was added. The resulting mixture was stirred, and then the solution was poured while stirred vigorously into about 6 L of 10 wt. % aqueous solution of acetic acid. The formed precipitates were collected by filtration, and then washed successively with flowing water, with hot water and again with flowing water. After the solvent was removed with centrifugation, the precipitates were dried at 50° C.

(Analysis of Cellulose Acetate)

With respect to the prepared cellulose acetate, the degree of acetyl substitution (average in total) and the degree of polymerization were measured.

Further, the elution curve of a reverse phase HPLC was measured, and converted into a distribution curve of intermolecular substitution degree to determine the half width of the maximum peak.

The results are set forth in Table 1.

Next, the degrees of substitution at 2-, 3- and 6-positions (2DS, 3DS and 6DS) were measured. The results are set forth in Table 2. The degrees of substitution at 2-, 3- and 6-positions (2DS, 3DS and 6DS) are plotted as the solid circle 1 in FIGS. 3 and 4.

The degrees of substitution were measured according to Tezuka, Carbohydr. Res., 273, 83 (1995). First, dissociated hydroxyls in the sample (cellulose acetate) were changed into propionate esters with propionic acid anhydride in pyridine. The obtained sample was then dissolved in heavy chloroform, and a $^{13}C$-spectrum was measured. The carbonyl carbons in the acetyls at 2-, 3- and 6-positions give signals in the order from higher magnetic field in the range of 169 to 171 ppm. The carbonyl carbons in the propionate esters at 2-, 3- and 6-positions give signals in the order from higher magnetic field in the range of 172 to 174 ppm. According to the obtained signals, the ratio between the acetyl and the propionyl at 2-, 3- or 6-position was determined to obtain the distribution of acetyls in the sample cellulose acetate.

(Preparation of Cellulose Acetate Solution)

At room temperature, 17 weight parts of prepared cellulose acetate, 80.28 weight parts of a mixed solvent of methyl acetate/methanol/n-butanol (ratio: 80/15/5 wt. %) and 2.72 weight parts of triphenyl phosphate (plasticizer) were mixed. In the mixture, the cellulose acetate was not dissolved but swelled. The obtained swelled mixture was in the form of slurry.

The swelled mixture was placed in a container having an outer jacket. While the mixture was slowly stirred, water and ethylene glycol as refrigerant were poured into the outer jacket. The refrigerant cooled the mixture in the inner container to −30° C. at the cooling rate of 8° C. per minute, and kept cooling for 30 minutes until the mixture was homogeneously solidified.

The refrigerant was then removed from the jacket, and instead hot water was poured into the jacket. Becoming in the form of a sol to a degree, the mixture was stirred to warm to room temperature at the warming rate of 8° C. per minute.

The above cooling and warming procedures were repeated.

The solution prepared by the cooling dissolution method was stored at room temperature (23° C.), and then observed. As a result, even after 20 days, the solution kept good transparency and homogeneity, and accordingly exhibited good solubility and stability.

(Formation of Cellulose Acetate Film)

The prepared solution was cast on a band of 6 m (effective length) to form a film having the thickness of 100 μm. The temperature of the band was 0° C. After air was blown for 2 seconds to dry, the film was peeled off the band. The film was then further dried step by step at 100° C. for 3 minutes, at 130° C. for 5 minutes and at 160° C. for 5 minutes with the ends of the film fixed, and thereby the solvent remaining in the film was removed. The prepared film was further dried at 120° C. for 3 hours. Thus, a cellulose acetate film was formed.

The formed film exhibited preferable optical characters (high optical isotropy and transparency).

Example 2

Ripening of Cellulose Acetate

Commercially available cellulose acetate (polymerization degree: 360, degree of substitution determined by NMR: 2.84), which was obtained by acetylating cotton linter under normal conditions, was used. The cellulose acetate in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 2.65 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 1.63 mol. %.

The obtained solution was kept at 30° C. for 3 hours to ripen the cellulose acetate.

The reaction parameter (R=YZ/Xdt) in this ripening step was calculated and found 55.

(Post Treatment)

After the ripening step was completed, sodium acetate in 2 equivalent weights based on the amount of perchloric acid (1.75 weight parts based on 1 weight part of 70 wt. % perchloric acid aqueous solution) was added. The resulting mixture was stirred well, and then about 7.5 L of water was gradually added to the solution with the solution stirred vigorously. The formed precipitates were washed with flowing water until acetic acid did not smell. After water was removed with centrifugation, the precipitates were further washed with flowing water. Water was again removed with centrifugation, and then the precipitates were dried at 50° C.

(Analysis of Cellulose Acetate)

The obtained cellulose acetate was analyzed in the same manner as in Example 1. The results are set forth in Tables 1

& 2. The degrees of substitution at 2-, 3- and 6-positions (2DS, 3DS and 6DS) are plotted as the solid circle 2 in FIGS. 3 & 4.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, even after 20 days, the solution kept good transparency and homogeneity, and accordingly exhibited good solubility and stability.

(Formation of Cellulose Acetate Film)

A cellulose acetate film was formed in the same manner as in Example 1, except that the prepared solution was used.

The formed film exhibited preferable optical characters (high optical isotropy and transparency).

Example 3

Ripening of Cellulose Acetate

The commercially available cellulose acetate used in Example 2 in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 2.65 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 1.63 mol. %.

The obtained solution was kept at 30° C. for 5 hours to ripen the cellulose acetate.

The reaction parameter (R=YZ/Xdt) in this ripening step was calculated and found 92.

(Analysis of Cellulose Acetate)

The ripened cellulose acetate was treated and analyzed in the same manner as in Example 2. The results are set forth in Tables 1 & 2. The degrees of substitution at 2-, 3- and 6-positions (2DS, 3DS and 6DS) are plotted as the solid circle 3 in FIGS. 3 & 4.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, even after 20 days, the solution kept good transparency and homogeneity, and accordingly exhibited good solubility and stability.

(Formation of Cellulose Acetate Film)

A cellulose acetate film was formed in the same manner as in Example 1, except that the prepared solution was used.

The formed film exhibited preferable optical characters (high optical isotropy and transparency).

Example 4

Ripening of Cellulose Acetate

The commercially available cellulose acetate used in Example 2 in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 18.35 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 4.18 mol. %.

The obtained solution was kept at 30° C. for 10 hours to ripen the cellulose acetate.

The reaction parameter (R=YZ/Xdt) in this ripening step was calculated and found 72.

(Analysis of Cellulose Acetate)

The ripened cellulose acetate was treated and analyzed in the same manner as in Example 2. The results are set forth in Tables 1 & 2. The degrees of substitution at 2-, 3- and 6-positions (2DS, 3DS and 6DS) are plotted as the solid circle 4 in FIGS. 3 & 4.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, even after 20 days, the solution kept good transparency and homogeneity, and accordingly exhibited good solubility and stability.

(Formation of Cellulose Acetate Film)

A cellulose acetate film was formed in the same manner as in Example 1, except that the prepared solution was used.

The formed film exhibited preferable optical characters (high optical isotropy and transparency).

Example 5

Ripening of Cellulose Acetate

The commercially available cellulose acetate used in Example 2 in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 18.35 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 4.18 mol. %.

The obtained solution was kept at 30° C. for 15 hours to ripen the cellulose acetate.

The reaction parameter (R=YZ/Xdt) in this ripening step was calculated and found 107.

(Analysis of Cellulose Acetate)

The ripened cellulose acetate was treated and analyzed in the same manner as in Example 2. The results are set forth in Tables 1 & 2. The degrees of substitution at 2-, 3- and 6-positions (2DS, 3DS and 6DS) are plotted as the solid circle 5 in FIGS. 3 & 4.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, even after 20 days, the solution kept good transparency and homogeneity, and accordingly exhibited good solubility and stability.

(Formation of Cellulose Acetate Film)

A cellulose acetate film was formed in the same manner as in Example 1, except that the prepared solution was used.

The formed film exhibited preferable optical characters (high optical isotropy and transparency).

Comparison Example 1

Ripening of Cellulose Acetate

The cellulose acetate prepared in Example 1 in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 54.13 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 10.00 mol. %.

The obtained solution was kept at 30° C. for 20 hours to ripen the cellulose acetate.

The reaction parameter (R=YZ/Xdt) in this ripening step was calculated and found 60.

(Analysis of Cellulose Acetate)

The ripened cellulose acetate was treated and analyzed in the same manner as in Example 2. The results are set forth in Tables 1 & 2. The degrees of substitution at 2-, 3- and 6-positions (2DS, 3DS and 6DS) are plotted as the open circle C1 in FIGS. 3 & 4.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, the solution showed white turbidity, and opaque lump was observed.

Comparison Example 2

Ripening of Cellulose Acetate

The cellulose acetate prepared in Example 1 in the amount of 200 g was dissolved in a mixture of 1,167 ml of dichloromethane and 834 ml of acetic acid. From the obtained solution, dichloromethane was distilled off by means of a rotary evaporator. To the resulting liquid, 2,050 g of acetic acid, 54.13 g of water and 24.4 g of 70 wt. % aqueous solution of perchloric acid were added to dissolve the cellulose acetate. The ratio of water (total amount of added water and water contained in the aqueous solution of perchloric acid) to acetic acid (acetyl donor) was 10.00 mol. %.

The obtained solution was kept at 30° C. for 30 hours to ripen the cellulose acetate.

The reaction parameter (R=YZ/Xdt) in this ripening step was calculated and found 90.

(Analysis of Cellulose Acetate)

The ripened cellulose acetate was treated in the same manner as in Example 1.

Next, the degrees of substitution at 2-, 3- and 6-positions (2DS, 3DS and 6DS) were measured. The results are set forth in Table 2. The degrees of substitution at 2-, 3- and 6-positions (2DS, 3DS and 6DS) are plotted as the solid circle 1 in FIG. 4 (while the open circle C2 is out of the range shown in FIG. 3).

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, the solution was transparent, but partially not uniform.

Comparison example 3

Synthesis of Cellulose Acetate

To 100 weight parts of cellulose (made from wood pulp), 14.2 weight parts of sulfuric acid, 260 weight parts of acetic anhydride and 360 weight parts of acetic acid were added. The mixture was subjected to an acetylation reaction at 40° C. for 95 minutes. Two third of sulfuric acid was neutralized with magnesium acetate to form magnesium sulfate.

The amount of water to acetic acid (acetyl donor) after neutralizing reaction was 20 mol %.

(Ripening of Cellulose Acetate)

The obtained solution was kept at 65° C. for 100 minutes to ripen cellulose acetate. The solution was treated in the same manner as in Example 1, and cellulose acetate was separated from the solution.

The reaction parameter (R=YZ/Xdt) in this ripening step was calculated and found 15.

(Analysis of Cellulose Acetate)

The ripened cellulose acetate was analyzed in the same manner as in Example 1. The results are set forth in Tables 1 & 2.

(Preparation of Cellulose Acetate Solution)

A cellulose acetate solution was prepared in the same manner as in Example 1, except that the obtained cellulose acetate was used.

The prepared solution was stored at room temperature (23° C.), and then observed. As a result, the solution was transparent, but partially not uniform.

Comparison Example 4

Synthesis of Cellulose Acetate

To 550 g of cotton linter, 2747 g of acetic acid, 1630 g of acetic anhydride and 64.4 g of sulfuric acid were added in a kneader. The mixture was heated from 0° C. to 40° C. for 120 minutes to conduct acetylation reaction.

(Ripening of Cellulose Acetate)

To the obtained solution, 328 g of 24 wt. % aqueous solution of magnesium acetate was added. The resulting solution (in consideration of water contents of stating materials) comprised 979 g of cellulose acetate, 4053 g of acetic acid, 10.1 g sulfuric acid and 177 g of water. The ratio of water/acetyl donor was 14.5 mol %.

The obtained solution was kept at 52° C. for 100 minutes to ripen cellulose acetate.

The reaction parameter (R=YZ/Xdt) in this ripening step was calculated and found 3.7.

(Post Treatment)

After ripening cellulose acetate, 376 g of 24 wt. % aqueous solution of magnesium acetate was added to the cellulose acetate, and the mixture was stirred. The obtained solution was poured into about 12 liter of 10 wt. % aqueous solution of acetic acid while stirring vigorously. The formed precipitates were filtered off, washed with water flow, washed with hot water, washed with water flow again, centrifuged from liquid, and dried at 50° C.

(Analysis of Cellulose Acetate)

With respect to the prepared cellulose acetate, the degree of acetyl substitution (average in total) and the degree of polymerization were measured.

Further, the elution curve of a reverse phase HPLC was measured, and converted into a distribution curve of intermolecular substitution degree to determine the half width of the maximum peak.

The results are set forth in Table 1.

TABLE 1

| Cellulose acetate | Total degree of substitution | Maximum peak Degree of substitution[1] | Half width | Value of Y[2] | Degree of polymerization | Solubility[3] |
|---|---|---|---|---|---|---|
| Ex. 1 | 2.854 | 2.847 | 0.066 | 0.069 | 284 | A |
| Ex. 2 | 2.854 | 2.854 | 0.067 | 0.069 | 302 | A |
| Ex. 3 | 2.856 | 2.853 | 0.059 | 0.068 | 284 | A |
| Ex. 4 | 2.786 | 2.795 | 0.067 | 0.081 | 305 | A |
| Ex. 5 | 2.765 | 2.811 | 0.071 | 0.084 | 291 | A |
| Comp. 1 | 2.684 | 2.692 | 0.100 | 0.097 | 350 | C |
| Comp. 3 | 2.733 | 2.737 | 0.096 | 0.089 | 292 | B |
| Comp. 4 | 2.844 | 2.851 | 0.086 | 0.070 | 298 | B |

(Remarks)

[1]Degree of substitution at the maximum peak

[2]$Y = -0.1788X + 0.5788$ (wherein X is the total degree of substitution)

[3]A: Transparent uniform solution B: Transparent but not uniform C: White, turbid and not transparent

TABLE 2

| Cellulose acetate | Amount of water (mol %) | Reaction parameter (R) | Degree of substitution of cellulose acetate 2DS | 3DS | 6DS | Degree of polymerization |
|---|---|---|---|---|---|---|
| Ex. 1 | 4.68 | 41 | 0.959 | 0.955 | 0.940 | 284 |
| Ex. 2 | 1.63 | 55 | 0.962 | 0.960 | 0.932 | 302 |
| Ex. 3 | 1.63 | 92 | 0.960 | 0.953 | 0.943 | 284 |
| Ex. 4 | 4.18 | 72 | 0.937 | 0.917 | 0.932 | 305 |
| Ex. 5 | 4.18 | 107 | 0.929 | 0.896 | 0.940 | 291 |
| Comp. 1 | 10.00 | 60 | 0.917 | 0.869 | 0.898 | 350 |
| Comp. 2 | 10.00 | 90 | 0.882 | 0.826 | 0.907 | 339 |
| Comp. 3 | 19.67 | 15 | 0.947 | 0.947 | 0.839 | 292 |

Example 6

Synthesis of Cellulose Acetate

To 100 weight parts of cellulose prepared from cotton linter, 9.2 weight parts of sulfuric acid, 276 weight parts of acetic anhydride and 551 weight parts of acetic acid were added. The cellulose was then subjected to an ester forming reaction in a conventional manner. After neutralized with magnesium acetate, the reaction mixture was kept at 62° C. for 40 minutes to prepare cellulose acetate.

(Ripening of Cellulose Acetate)

The obtained cellulose acetate was ripened in the manner described in Example 1 except that the ratios of water and perchloric acid (catalyst) to acetic acid (acetyl donor) and the reaction parameter (R=YZ/Xdt) were changed into 1.63 mol. %, 0.498 mol. % and 55, respectively.

(Analysis of Cellulose Acetate)

The ripened cellulose acetate was analyzed in the same manner as in Example 1. The results are set forth in Table 3. The degrees of substitution at 2-, 3- and 6-positions (2DS, 3DS and 6DS) are plotted as the solid circle 6 in FIGS. 3 & 4.

(Measurement of Infrared Absorption Spectrum)

In 5 g of a mixed solvent of methylene chloride/methanol (9/1, by weight), 200 mg of the cellulose acetate dried well was dissolved. The solution was cast on a glass plate by means of a bar coater so that the thickness might be even. The solution layer on the plate was dried by air to form a film. The thickness of the film was adjusted so that the transmittance (at the peak attributed to non-substituted hydroxyl of the cellulose acetate) might be about 40%.

The formed film was dried in vacuum at 105° C. for 30 minutes or more, and then cut into pieces having enough sizes (24 mm×27 mm) for a flame of IR generator so that IR rays might not be interrupted by a sample holder.

The film sample was kept under nitrogen atmosphere until the absorption peak at about 3650 $cm^{-1}$ attributed to adsorbed water disappeared. The infrared absorption spectrum was measured by means of FT-IR1650 (Parkin-Elmer). The measured spectrum was analyzed in the manner described above to obtain a half-width ($\Delta\nu_{1/2}$). The results are set forth in Table 3.

Example 7

Ripening of Cellulose Acetate

Commercially available cellulose acetate (polymerization degree: 360, degree of substitution determined by NMR: 2.84), which was obtained by acetylating cotton linter under normal conditions, was used. The cellulose acetate in the amount of 1,150 weight parts was dissolved in a mixture of 8,220 weight parts of dichloromethane and 4,800 weight parts of acetic acid. From the obtained solution, dichloromethane was distilled off by means of a rotary evaporator. The obtained liquid was transferred into a reaction tank, and 11,788 weight parts of acetic acid, 78 weight parts of water and 98 weight parts of perchloric acid were added. The ratio of water to acetic acid (acetyl donor) was 2.2 mol. %.

The obtained solution was kept at 30° C. for 5 hours to ripen the cellulose acetate.

The reaction parameter (R=YZ/Xdt) in this ripening step was calculated and found 67.5.

(Post Treatment)

After the ripening step was completed, 1.75 equivalent weights (based on the amount of perchloric acid) of sodium acetate in 10 wt. % acetic acid solution was added. The resulting mixture was stirred for 10 minutes to stop the reaction. Thus, cellulose acetate (viscosity average molecular weight: 288, degree of substitution: 2.84) was prepared.

(Analysis of Cellulose Acetate)

The obtained cellulose acetate was analyzed in the same manner as in Example 1. The results are set forth in Table 3. The degrees of substitution at 2-, 3- and 6-positions (2DS, 3DS and 6DS) are plotted as the solid circle 7 in FIGS. 3 & 4.

(Measurement of Infrared Absorption Spectrum)

The infrared absorption spectrum of the cellulose acetate was measured in the same manner as in Example 6 to obtain a half-width ($\Delta\nu_{1/2}$). The results are set forth in Table 3.

(Preparation of Cellulose Acetate Solution)

The prepared cellulose acetate in the amount of 15 weight parts was mixed in room temperature (25° C.) with 68 weight parts of methyl acetate and 17 weight parts of acetone, to prepare a slurry of 15 wt. %. The slurry was almost in the form of a transparent gel, but some opaque jellied parts were observed.

The slurry was cooled for 2 hours in cold methanol bath beforehand cooled at −40° C. with dry ice. In the thus-cooled slurry, many bubbles were formed by penetration of the solvent. After left at room temperature for 10 minutes, the slurry was kept for 10 minutes in water bath at 40° C. The thus obtained cellulose acetate solution had good transparency and fluidity.

Example 8

Ripening of Cellulose Acetate

Commercially available cellulose acetate (polymerization degree: 360, degree of substitution determined by NMR:

2.84), which was obtained by acetylating cotton linter under normal conditions, was used. The cellulose acetate in the amount of 200 weight parts was dissolved in a mixture of 1,600 weight parts of dichloromethane and 867 weight parts of acetic acid. From the obtained solution, dichloromethane was distilled off by means of a rotary evaporator. The obtained liquid was transferred into a reaction tank, and 2,050 weight parts of acetic acid, 18.7 weight parts of water and 24.3 weight parts of 70 wt. % aqueous solution of perchloric acid were added. The ratio of water to acetic acid (acetyl donor) was 4.2 mol. %.

The obtained solution was kept at 30° C. for 10 hours to ripen the cellulose acetate.

The reaction parameter (R=YZ/Xdt) in this ripening step was calculated and found 71.

(Post Treatment)

After the ripening step was completed, 1.75 equivalent weights (based on the amount of perchloric acid) of sodium acetate in 10 wt. % acetic acid solution was added. The resulting mixture was stirred for 10 minutes to stop the reaction. Thus, cellulose acetate (viscosity average molecular weight: 318, degree of substitution: 2.81) was prepared.

(Analysis of Cellulose Acetate)

The obtained cellulose acetate was analyzed in the same manner as in Example 1. The results are set forth in Table 3. The degrees of substitution at 2-, 3- and 6-positions (2DS, 3DS and 6DS) are plotted as the solid circle 8 in FIGS. 3 & 4.

(Measurement of Infrared Absorption Spectrum)

The infrared absorption spectrum of the cellulose acetate was measured in the same manner as in Example 6 to obtain a half-width ($\Delta\nu_{1/2}$). The results are set forth in Table 3.

(Preparation of Cellulose Acetate Solution)

The prepared cellulose acetate in the amount of 15 weight parts was mixed in room temperature (25° C.) with 68 weight parts of methyl acetate and 17 weight parts of acetone, to prepare a slurry of 15 wt. %. The slurry was almost in the form of a transparent gel, but some opaque jellied parts were observed.

The slurry was cooled for 2 hours in cold methanol bath beforehand cooled at −40° C. with dry ice. In the thus-cooled slurry, many bubbles were formed by penetration of the solvent. After left at room temperature for 10 minutes, the slurry was kept for 10 minutes in water bath at 40° C. The thus obtained cellulose acetate solution had good transparency and fluidity.

Example 9

Ripening of Cellulose Acetate

Commercially available cellulose acetate (polymerization degree: 360, degree of substitution determined by NMR: 2.84), which was obtained by acetylating cotton linter under normal conditions, was used. The cellulose acetate was ripened in the manner described in Example 1 except that the time for ripening, the ratios of water and perchloric acid (catalyst) to acetic acid (acetyl donor) and the reaction parameter (R=YZ/Xdt) were changed into 15 hours, 4.18 mol. %, 0.498 mol. % and 107, respectively.

(Analysis of Cellulose Acetate)

The obtained cellulose acetate was analyzed in the same manner as in Example 1. The results are set forth in Table 3. The degrees of substitution at 2-, 3- and 6-positions (2DS, 3DS and 6DS) are plotted as the solid circle 9 in FIGS. 3 & 4.

(Measurement of Infrared Absorption Spectrum)

The infrared absorption spectrum of the cellulose acetate was measured in the same manner as in Example 6 to obtain a half-width ($\Delta\nu_{1/2}$). The results are set forth in Table 3.

TABLE 3

| Ex. | Amount of water (mol %) | Reaction parameter (R) | Reaction time [1] | Half width [2] | Degree of substitution of cellulose acetate 2DS | 3DS | 6DS | Degree of polymerization |
|---|---|---|---|---|---|---|---|---|
| 6 | 1.63 | 55 | 3 | 128 | 0.965 | 0.963 | 0.933 | 300 |
| 7 | 2.20 | 67.5 | 5 | 123 | 0.959 | 0.943 | 0.937 | 288 |
| 8 | 4.18 | 71 | 10 | 121 | 0.945 | 0.926 | 0.935 | 318 |
| 9 | 4.18 | 107 | 15 | 119 | 0.925 | 0.896 | 0.941 | 301 |

(Remarks)
[1] Time for ripening cellulose acetate (hours),
[2] Half-width ($cm^{-1}$) of the absorption peak in the region of 3450 to 3550 $cm^{-1}$

Example 10

Measurement of Infrared Absorption Spectrum

Figure 6:
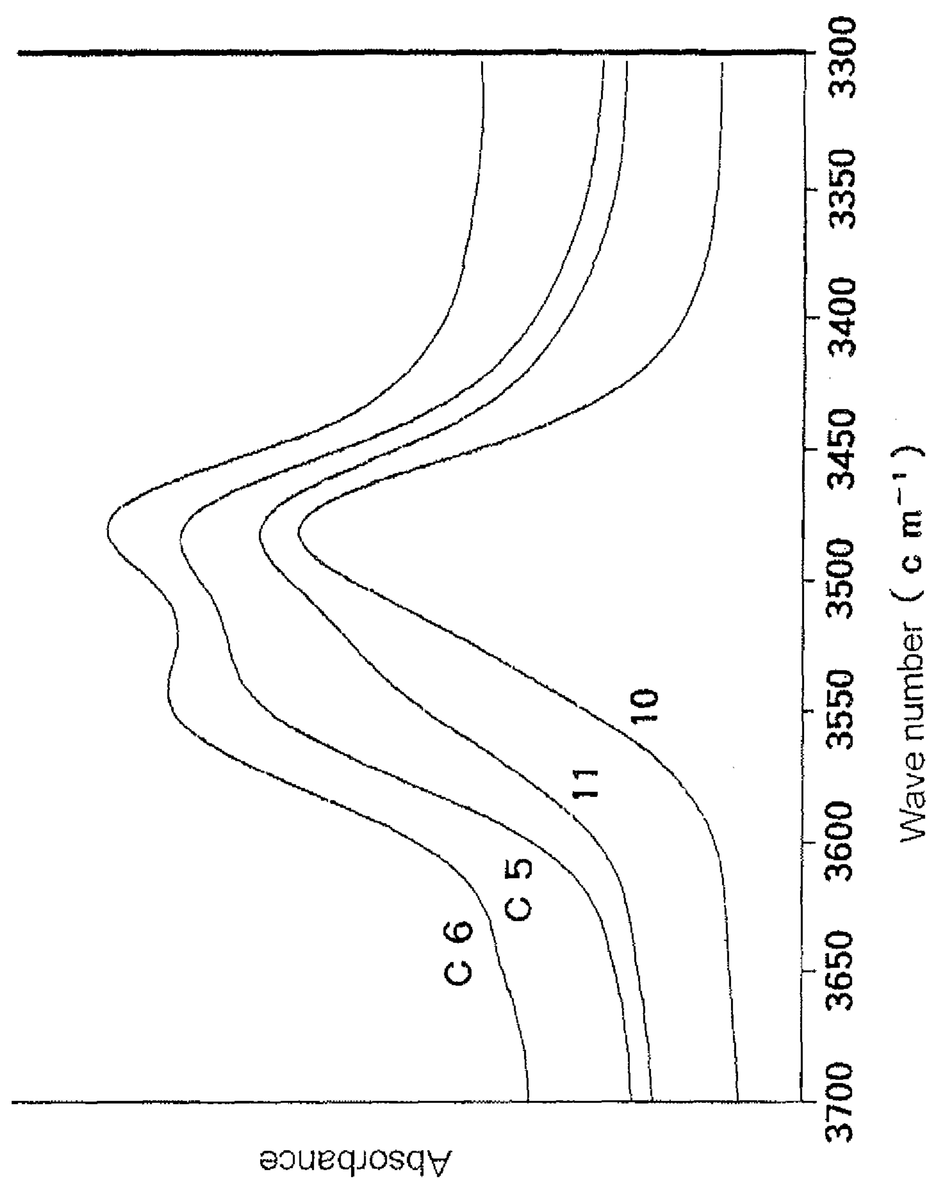
FIG. 6 shows infrared absorption spectra of Examples 10 and 11 and Comparison Examples 5 and 6.

With respect to cellulose acetate (total degree of substitution 2DS+3DS+6DS: 2.896, 2DS+3DS−6DS: 0.896), the infrared absorption spectrum was measured in the same manner as in Example 6. The obtained spectrum is shown in FIG. 6, and the half-width ($\Delta\nu_{1/2}$) was found 90.

Example 11

Measurement of Infrared Absorption Spectrum

With respect to cellulose acetate (total degree of substitution 2DS+3DS+6DS: 2.877, 2DS+3DS−6DS: 0.967), the infrared absorption spectrum was measured in the same manner as in Example 6. The obtained spectrum is shown in FIG. 6, and the half-width ($\Delta\nu_{1/2}$) was found 118.

Comparison Example 5

Measurement of Infrared Absorption Spectrum

With respect to cellulose acetate (total degree of substitution 2DS+3DS+6DS: 2.845, 2DS+3DS−6DS: 1.069), the infrared absorption spectrum was measured in the same manner as in Example 6. The obtained spectrum is shown in FIG. 6, and the half-width ($\Delta\nu_{1/2}$) was found 137.

Comparison Example 6

Measurement of Infrared Absorption Spectrum

With respect to cellulose acetate (total degree of substitution 2DS+3DS+6DS: 2.925, 2DS+3DS−6DS: 1.075), the infrared absorption spectrum was measured in the same manner as in Example 6. The obtained spectrum is shown in FIG. 6, and the half-width ($\Delta\nu_{1/2}$) was found 137.

Example 12

Ripening of Cellulose Acetate

A dried commercially available cellulose acetate (polymerization degree: 311, degree of substitution determined by NMR: 2.85), which was obtained by acetylating wood pulp under normal conditions, was obtained. The cellulose acetate in the amount of 500 g was dissolved in a mixture of 1,333 g of dichloromethane and 1,033 g of acetic acid. With the solution stirred, 150 g of acetic acid containing 13.3 g of water was added. After homogenized, the solution was kept at 40° C. While the solution was stirred, 150 g of acetic acid containing 36.92 g of toluenesulfonic acid monohydrate was added to start ripening. The ratio of water to acetic acid (acetyl donor) was 4.2 mol. %. After 7 hours, 260 g of acetic acid containing 29 g of sodium acetic anhydride was dropped to stop ripening.

The reaction parameter (R=YZ/Xdt) in this ripening step was calculated and found 151.

(Post Treatment)

From the reacted solution, dichloromethane was distilled off by means of a rotary evaporator. To the resulting solution, about 4.5 L of water was gradually added with the solution stirred vigorously in the same manner as in Example 2. The formed precipitates were collected, washed, and the solvent was removed by centrifugation. The precipitates were further washed with flowing water, and the solvent was removed again by centrifugation. The precipitates were then dried at 50° C.

(Analysis of Cellulose Acetate)

The obtained cellulose acetate was analyzed in the same manner as in Example 1. The results are set forth in Table 4. The degrees of substitution at 2-, 3- and 6-positions (2DS, 3DS and 6DS) are plotted as the solid circle 12 in FIGS. 3 & 4.

Example 13

Ripening of Cellulose Acetate

The cellulose acetate was ripened and subjected to post treatment in the manner described in Example 12 except that the amount of water (the ratio of water to acetic acid (acetyl donor)) and the reaction time were changed into 2.91 g (1.6 mol. %) and 140 minutes, respectively.

The reaction parameter (R=YZ/Xdt) in this ripening step was calculated and found 132.

(Analysis of Cellulose Acetate)

The ripened cellulose acetate was analyzed in the same manner as in Example 1. The results are set forth in Table 4. The degrees of substitution at 2-, 3- and 6-positions (2DS, 3DS and 6DS) are plotted as the solid circle 13 in FIGS. 3 & 4.

Example 14

Synthesis of Cellulose Acetate

Wood pulp (water content: 8.2 wt. %) was broken into pieces. To 1,520 g of the pulp, 698 g of acetic acid was evenly sprinkled. The resulting mixture was then stirred. After left at room temperature for 90 minutes, the mixture was poured into another mixture of 3930.6 g of acetic anhydride beforehand cooled at about −10° C., 5755 g of acetic acid and 115.4 g of 98% sulfuric acid. The temperature of the obtained mixture was linearly elevated for 70 minutes from 0° C. (when the reaction was started) to 37° C. The temperature was then kept at 37° C. for 80 minutes, to synthesize cellulose acetate.

(Ripening of Cellulose Acetate)

To a solution of the above-prepared cellulose acetate, 383.7 g of 30% aqueous solution of acetic acid was added. The mixture was heated to 47° C., and kept at the temperature for 130 minute. The ratio of water to acetic acid (acetyl donor) was 6.0 mol. %. After that, 297 g of aqueous solution of magnesium acetate tetrahydrate was added to stop ripening.

The reaction parameter (R=YZ/Xdt) in this ripening step was calculated and found 43.

(Post Treatment)

The resulting solution was poured into about 30 L of 10% acetic acid aqueous solution with the solution stirred vigorously. The formed precipitates were collected, washed successively with flowing water, with hot water and again with flowing water, and then the solvent was removed by centrifugation. The precipitates were then dried at 50° C.

(Analysis of Cellulose Acetate)

The obtained cellulose acetate was analyzed in the same manner as in Example 1. The results are set forth in Table 4. The degrees of substitution at 2-, 3- and 6-positions (2DS, 3DS and 6DS) are plotted as the solid circle 14 in FIGS. 3 & 4.

TABLE 4

| Cellulose acetate | Amount of water (mol %) | Reaction parameter (R) | Degree of substitution of cellulose acetate 2DS | 3DS | 6DS | Degree of polymerization |
|---|---|---|---|---|---|---|
| Ex. 12 | 4.20 | 151 | 0.953 | 0.936 | 0.925 | 288 |
| Ex. 13 | 1.60 | 132 | 0.972 | 0.967 | 0.916 | 298 |
| Ex. 14 | 6.00 | 43 | 0.973 | 0.967 | 0.923 | 303 |

What is claimed is:

1. Cellulose acetate having a degree of acetyl substitution in the range of 2.636 to 2.958, wherein the cellulose acetate shows a distribution curve of an intermolecular substitution degree in which the maximum peak has a half width of less than Y defined in the following formula:

$$Y=-0.17788X+0.5788$$

in which X is the degree of acetyl substitution, and wherein the degrees of acetyl substitution at 2-, 3- and 6-positions satisfy the following formulas (I), (II), (III), and (VI):

$$2DS+3DS<6DS\times4-1.70 \quad (I)$$

$$2DS+3DS<-6DS\times4+5.70 \quad (II)$$

$$2DS+3DS>1.80 \quad (III)$$

$$2DS+3DS-6DS<1 \quad (VI)$$

in which 2DS is the degree of acetyl substitution at 2-position; 3DS is the degree of acetyl substitution at 3-position; and 6DS is the degree of acetyl substitution at 6-position.

2. The cellulose acetate defined in claim 1, wherein the degrees of acetyl substitution at 2- and 3-positions further satisfy the following formula (VII):

$$2DS+3DS>1.82 \quad (VII)$$

in which 2DS is the degree of acetyl substitution at 2-position; and 3DS is the degree of acetyl substitution at 3-position.

3. The cellulose acetate defined in claim 2, wherein the degrees of acetyl substitution at 2- and 3-positions further satisfy the following formula (VIII):

$$2DS+3DS>1.84 \quad \text{(VIII)}$$

in which 2DS is the degree of acetyl substitution at 2-position; and 3DS is the degree of acetyl substitution at 3-position.

4. The cellulose acetate defined in claim 1, wherein the degree of acetyl substitution at 6-position further satisfies the following formula (IX):

$$6DS<0.98 \quad \text{(IX)}$$

in which 6DS is the degree of acetyl substitution at 6-position.

5. The cellulose acetate defined in claim 1, wherein the cellulose acetate has a degree of acetyl substitution in the range of 2.636 to 2.958, and wherein the cellulose acetate shows a distribution curve of an intermolecular substitution degree in which the maximum peak has a half width of less than 0.080.

6. The cellulose acetate defined in claim 1, wherein the cellulose acetate has a degree of acetyl substitution in the range of 2.636 to 2.958, and wherein the cellulose acetate shows a distribution curve of an intermolecular substitution degree in which the maximum peak has a half width of less than Y defined in the following formula:

$$Y=-0.17788X+0.5788$$

in which X is the degree of acetyl substitution.

7. The cellulose acetate defined in claim 1, wherein the cellulose acetate shows an infrared absorption spectrum, and wherein the absorption spectrum has the absorption maximum in the wave number range of 3450 to 3550 $cm^{-1}$ in which the absorption maximum has a half width of 135 $cm^{-1}$ or less.

* * * * *